United States Patent [19]

Nose et al.

[11] Patent Number: 5,053,976
[45] Date of Patent: Oct. 1, 1991

[54] METHOD OF TEACHING A ROBOT

[75] Inventors: Hidetaka Nose; Kazuhiro Kawabata; Yoshihiko Suzuki, all of Sayama, Japan

[73] Assignee: Honda Giken Kogyo Kabushiki Kaisha, Tokyo, Japan

[21] Appl. No.: 355,455

[22] Filed: May 22, 1989

[51] Int. Cl.$^5$ ............................................. G06F 15/46
[52] U.S. Cl. ...................................... 364/513; 901/3; 901/42; 901/2
[58] Field of Search ................. 901/2, 3, 42; 364/513, 364/192

[56]     References Cited
        U.S. PATENT DOCUMENTS

| | | | |
|---|---|---|---|
| 4,380,696 | 4/1983 | Masaki | 364/513 |
| 4,420,812 | 12/1983 | Ito et al. | 364/513 |
| 4,580,229 | 4/1986 | Koyama et al. | 364/513 |
| 4,613,943 | 9/1986 | Miyake et al. | 364/513 |
| 4,677,276 | 6/1987 | Nio et al. | 901/42 |
| 4,700,118 | 10/1987 | Kishi et al. | 901/3 |
| 4,706,204 | 11/1987 | Hattori | 364/513 |
| 4,835,710 | 5/1989 | Schnelle et al. | 901/3 |

FOREIGN PATENT DOCUMENTS

| | | | |
|---|---|---|---|
| 0062244 | 10/1982 | European Pat. Off. | 364/513 |
| 0144442 | 5/1984 | European Pat. Off. | |
| 0123214 | 10/1984 | European Pat. Off. | |
| 0181406 | 5/1985 | European Pat. Off. | |
| 0188626 | 7/1985 | European Pat. Off. | |
| 0199821 | 11/1986 | European Pat. Off. | |
| 0264031 | 10/1987 | European Pat. Off. | |
| 0299403 | 7/1988 | European Pat. Off. | |

*Primary Examiner*—Allen R. MacDonald
*Assistant Examiner*—George Davis

[57]     ABSTRACT

An articulated robot such as an arc welding robot includes a plurality of articulations and an end effector having a tool center point. To teach the robot, a coordinate transformation matrix for transforming coordinates between the articulations is determined from condition data of the articulations. A present position of the tool center point is calculated based on the coordinate transformation matrix and a moving vector is determined from the present position of the tool center point to a next position thereof. Thereafter, a new coordinate transformation matrix for transforming coordinates between the articulations is determined so that the posture of the end effector at the next position of the tool center point, which is calculated based on the first-mentioned coordinate transformation matrix and the moving vector, will coincide with the posture of the end effector at the present position of the tool center point. Then, new condition data of the articulations are calculated from the new coordinate transformation matrix.

10 Claims, 15 Drawing Sheets

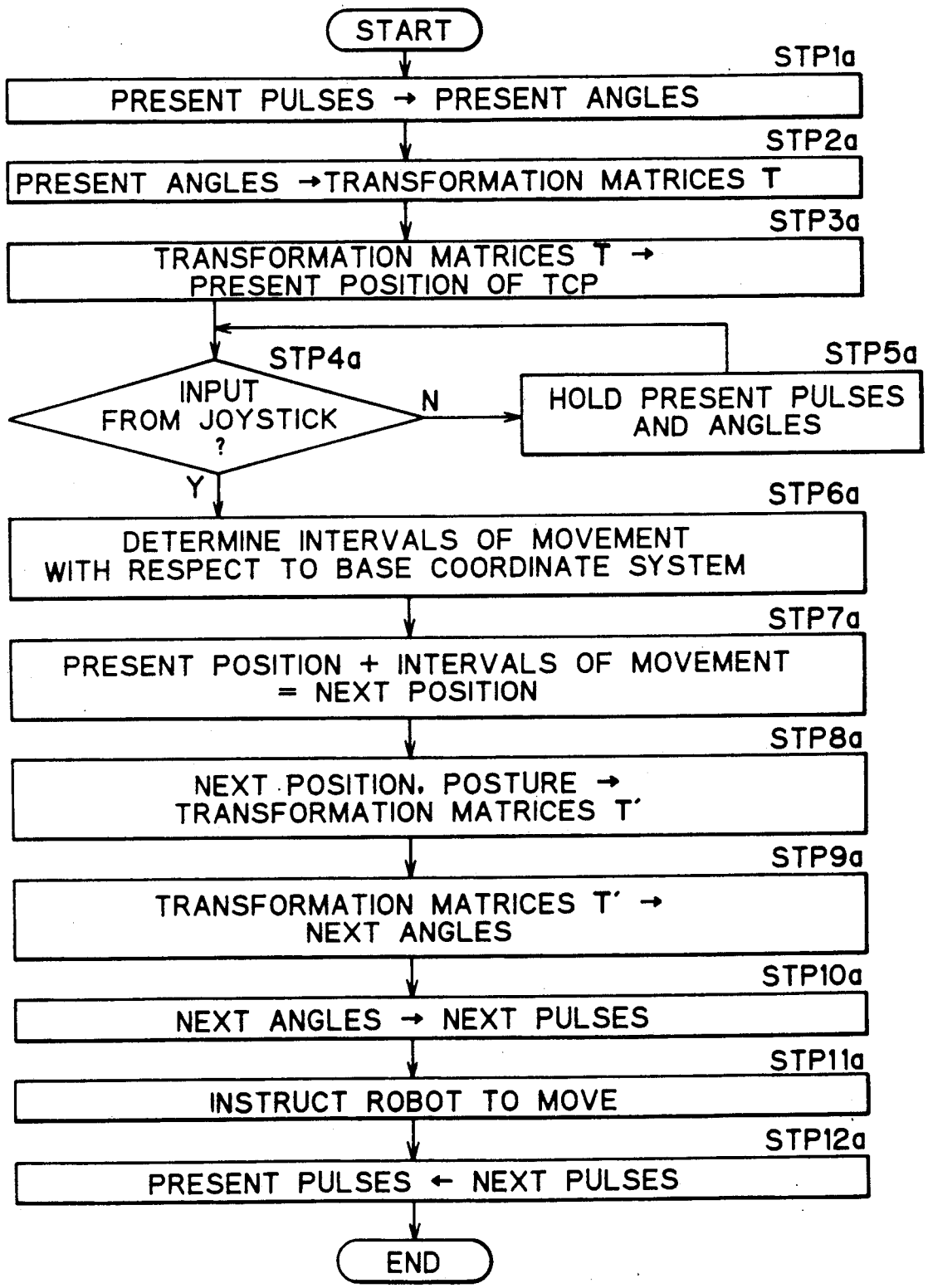

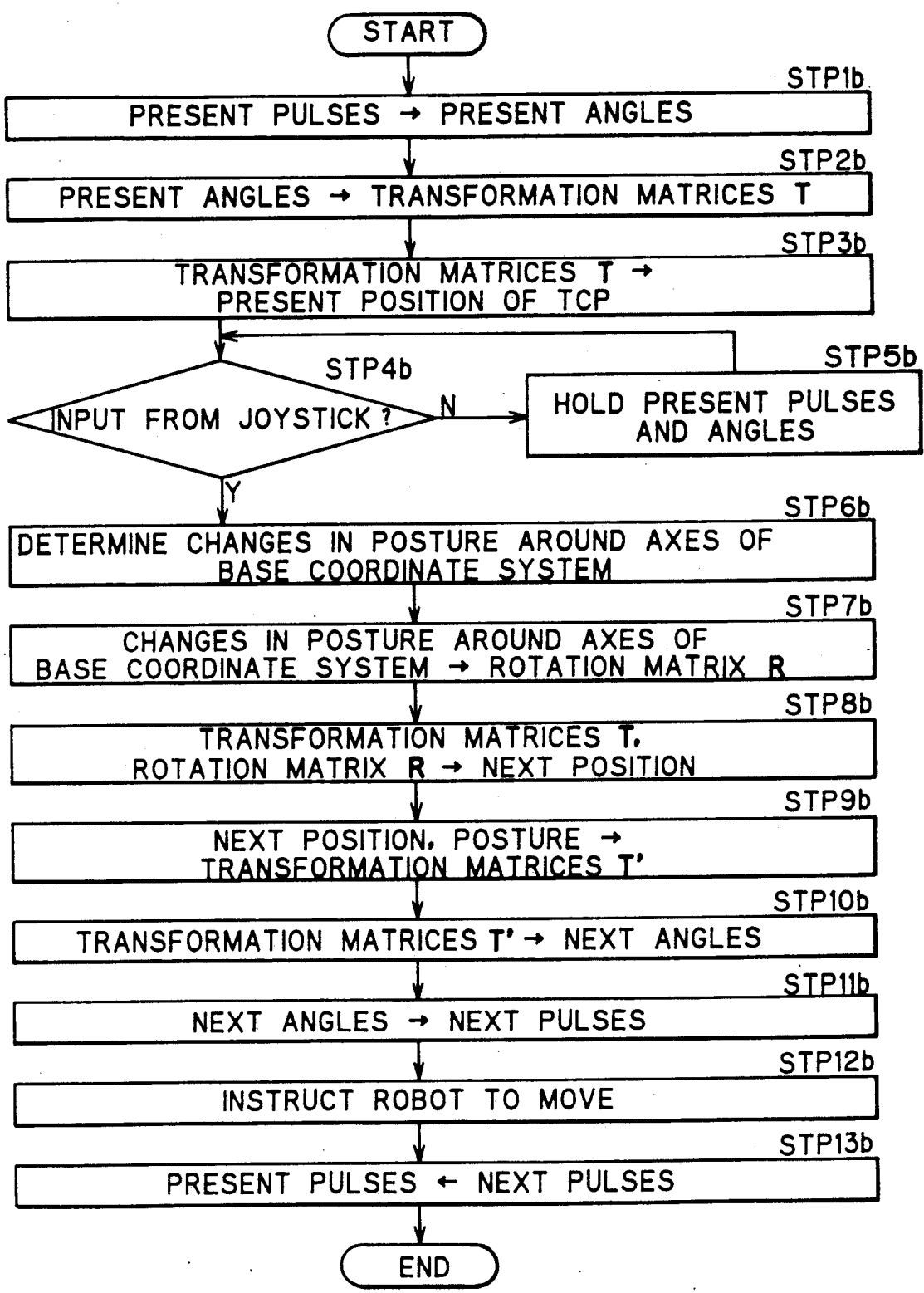

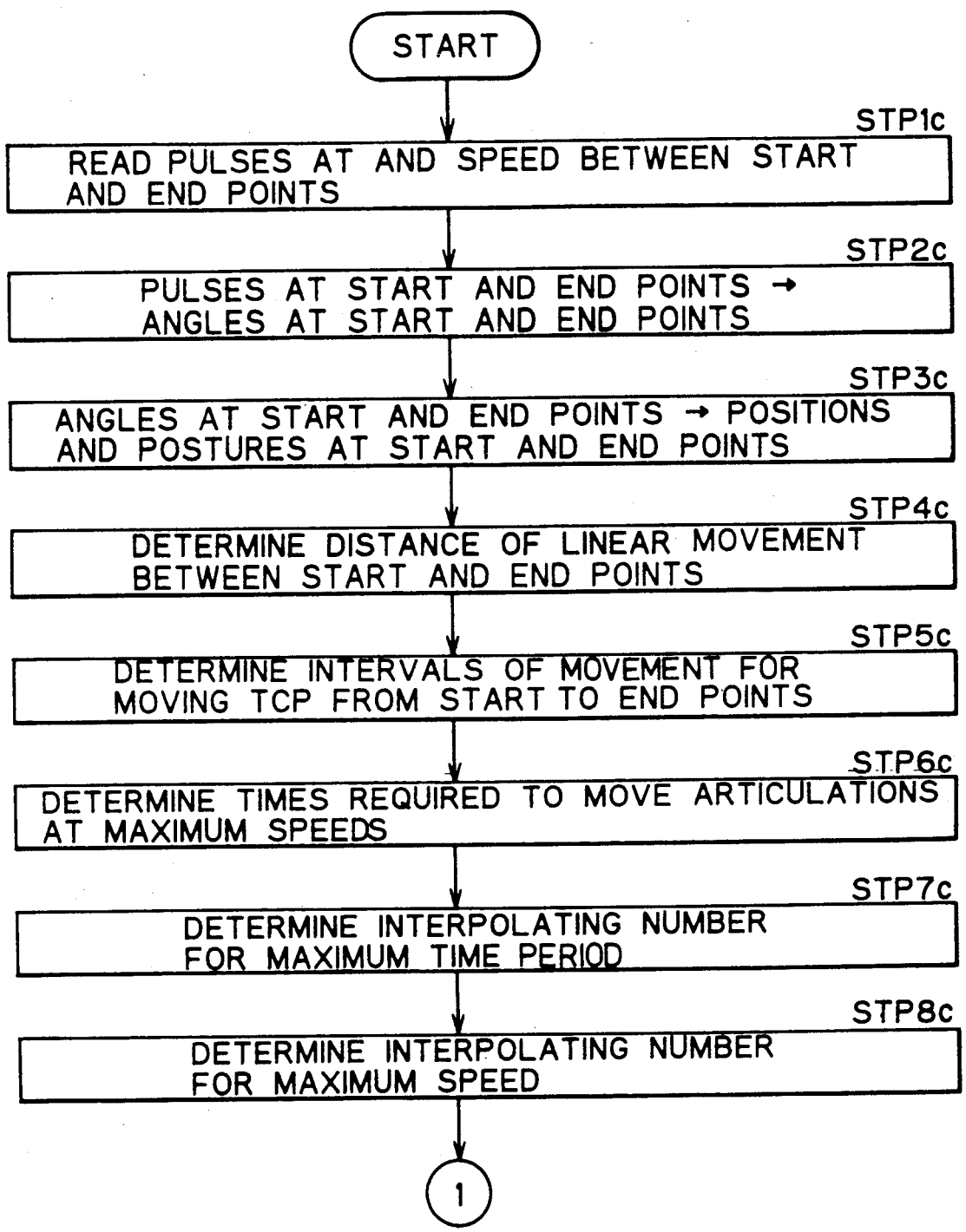

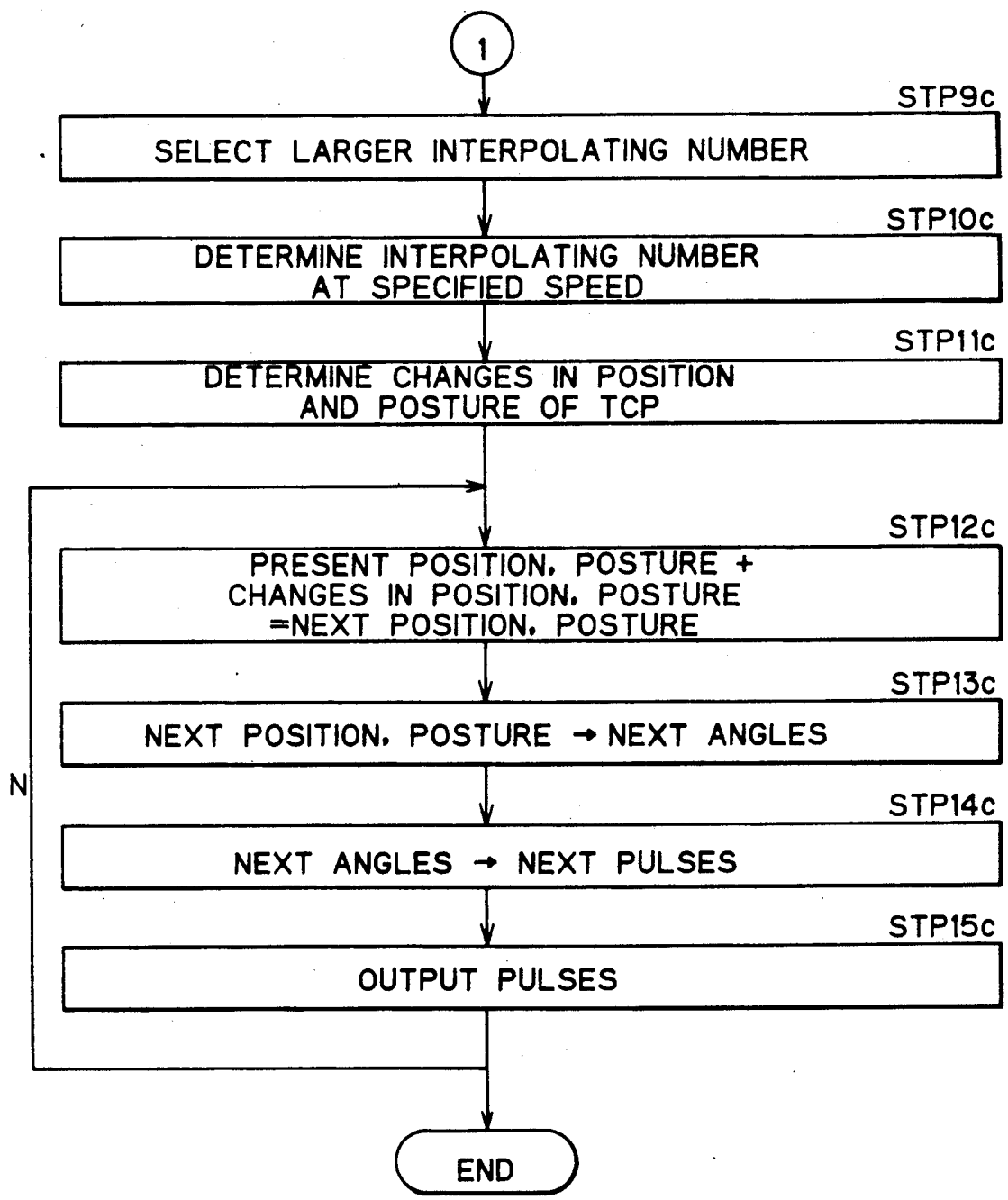

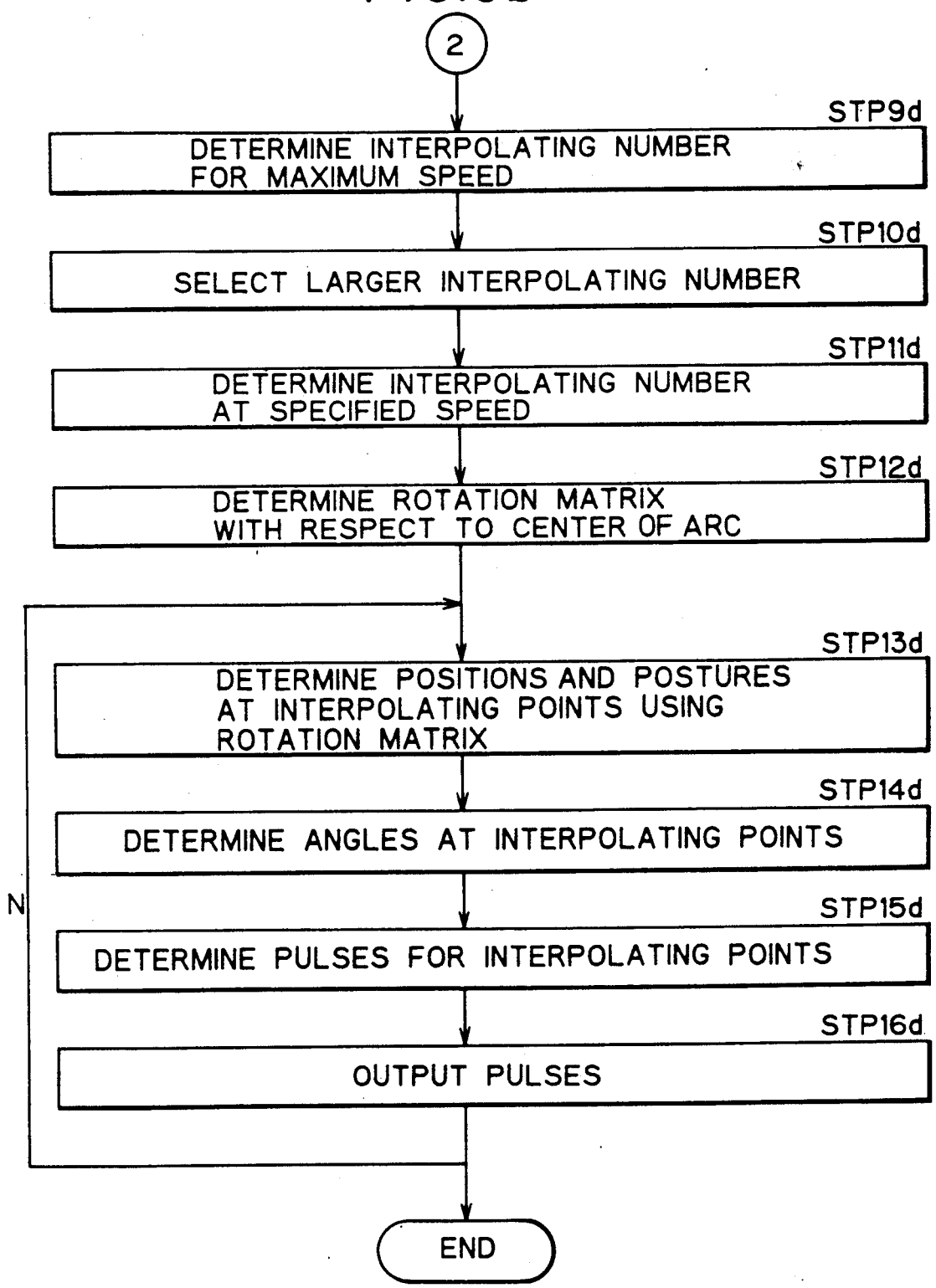

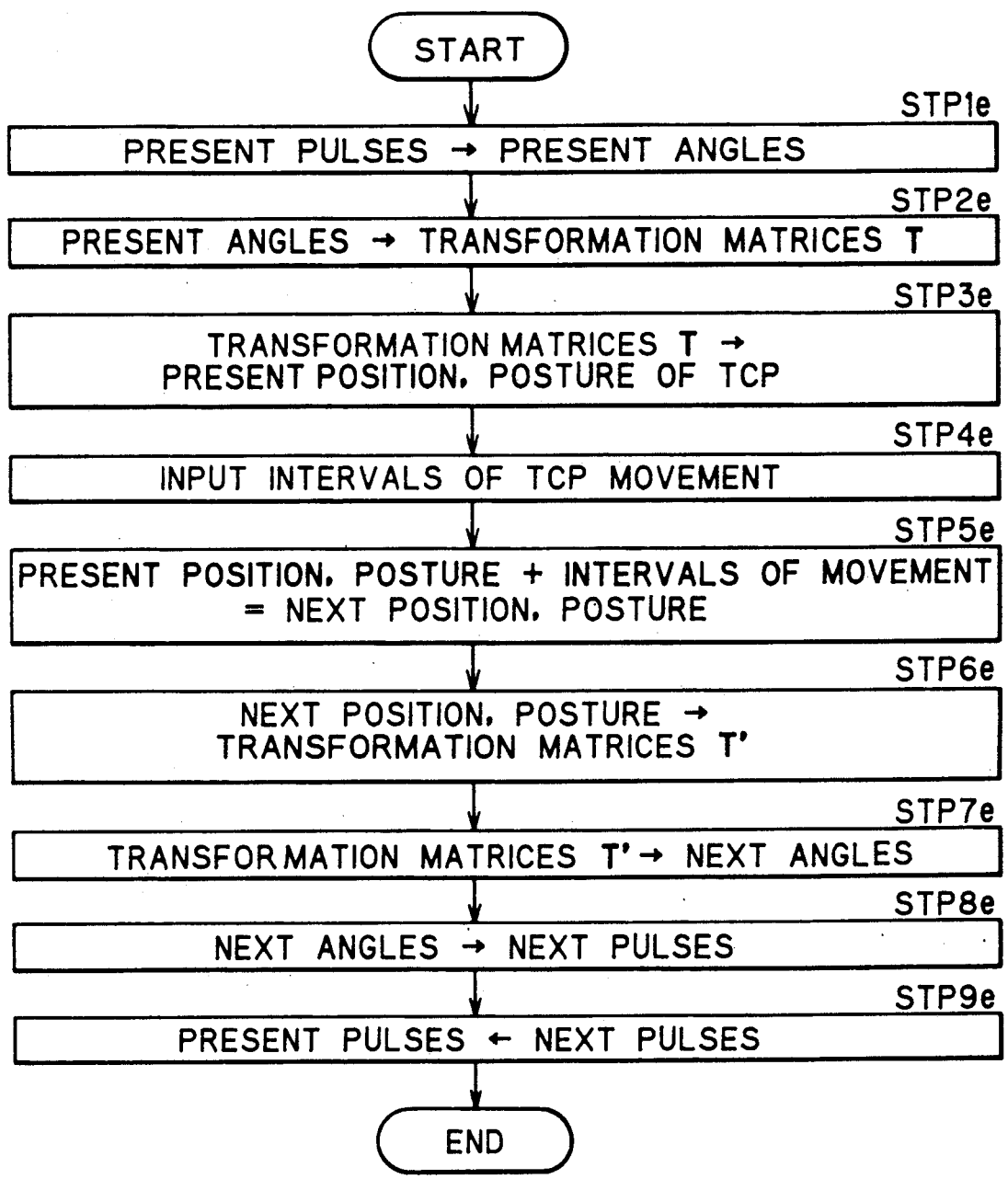

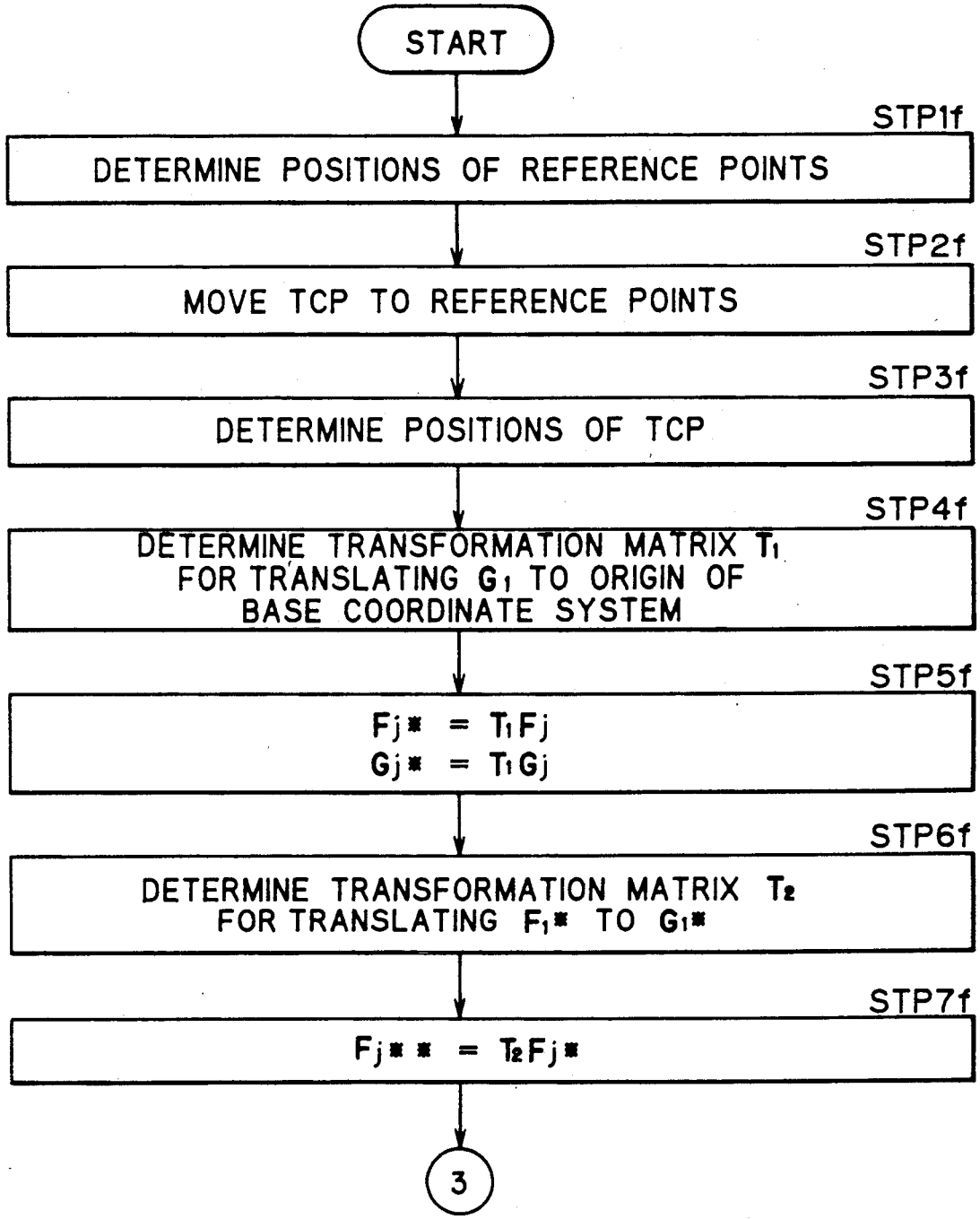

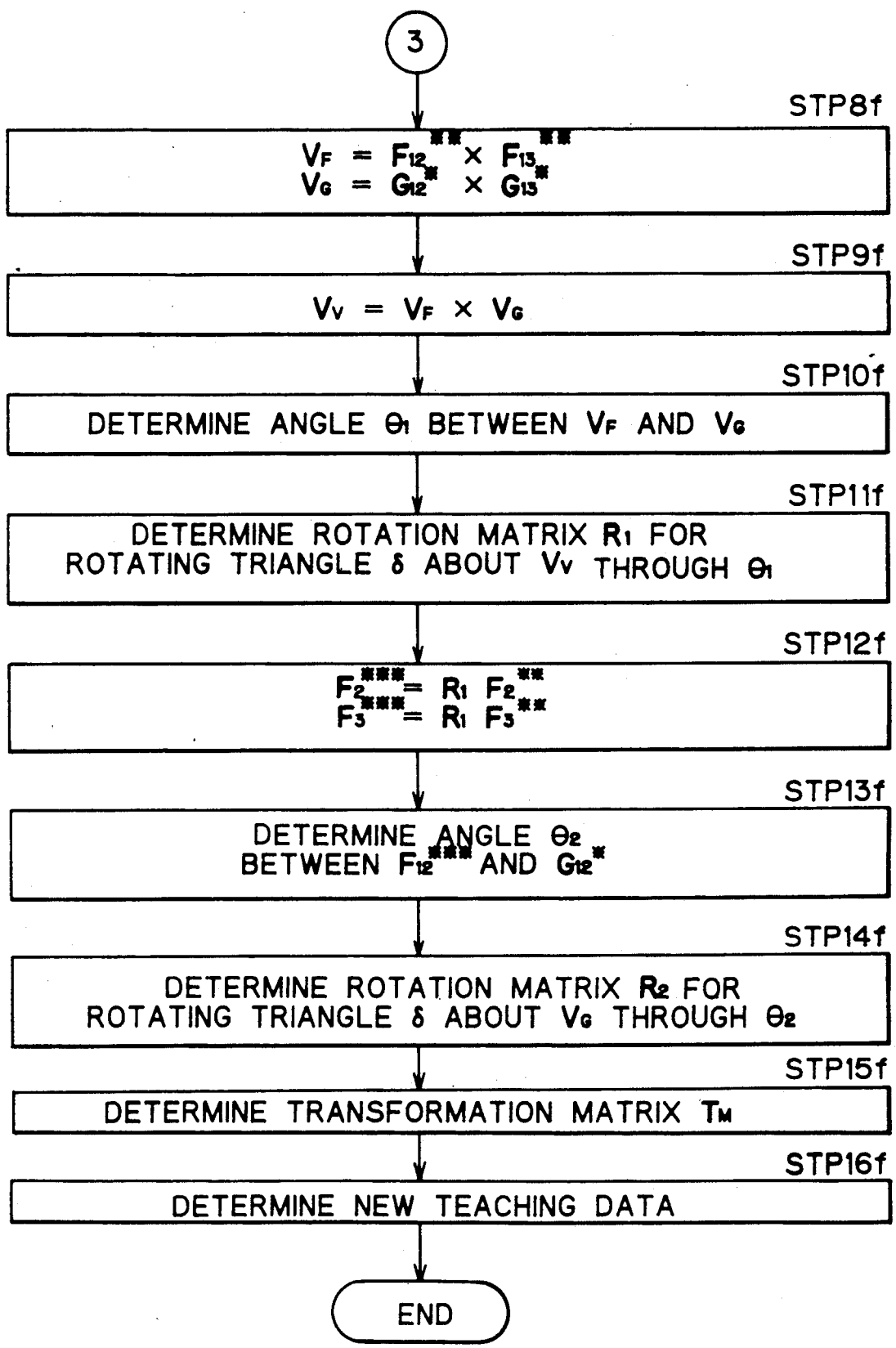

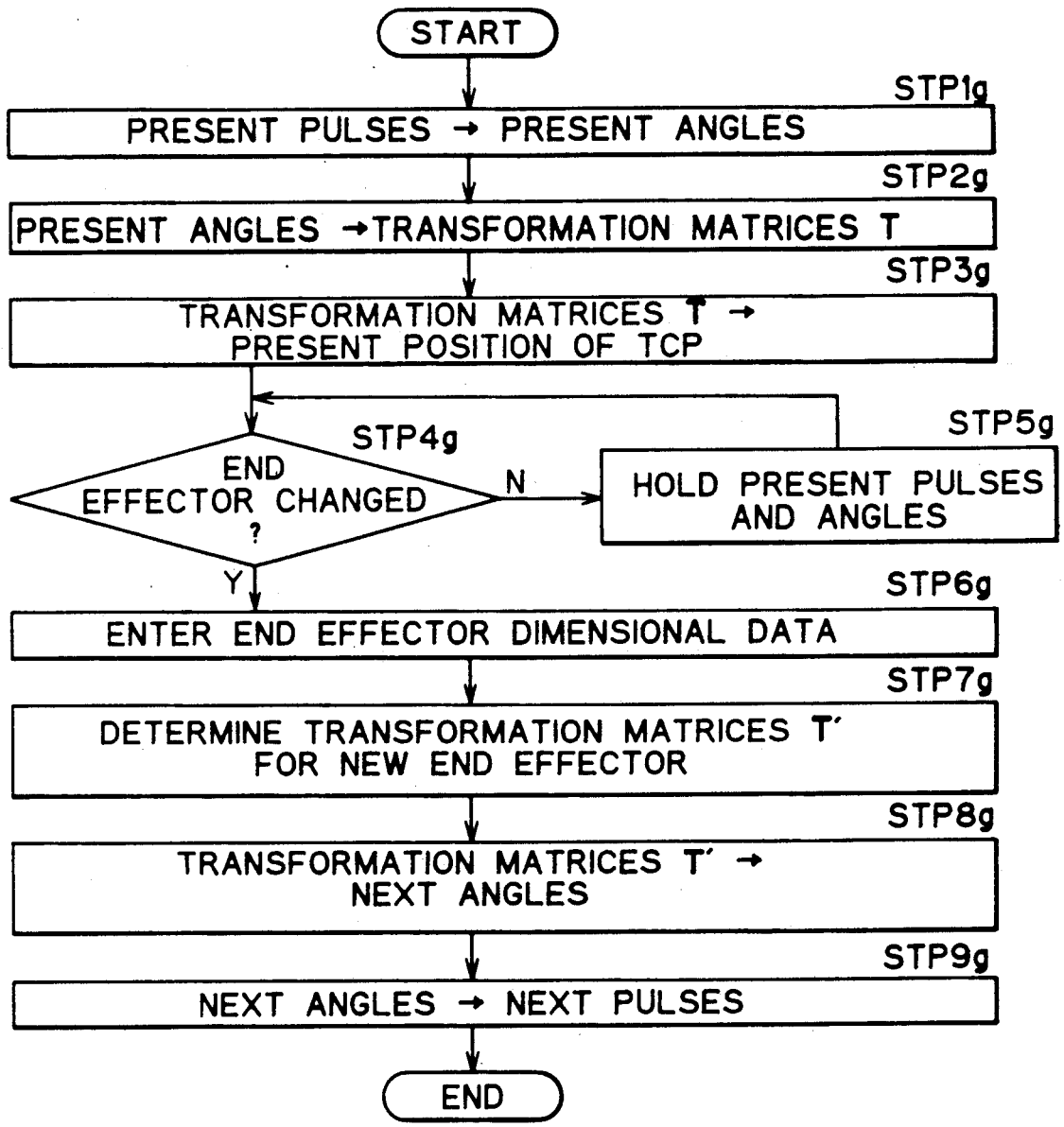

METHOD OF TEACHING A ROBOT

BACKGROUND OF THE INVENTION

The present invention relates to a method of teaching a robot, and more particularly to a robot teaching method which is capable of generating or correcting teaching data while additionally taking into account the posture or orientation of an end effector of a robot with respect to the tool center point (TCP).

Teaching boxes are used to instruct robots so that the end effectors mounted on the distal ends of robot arms will subsequently be moved automatically along programmed paths. Teaching boxes have an input means for selecting command values to drive the articulations of a robot and also for selecting coordinate systems used as a reference when teaching the robot, and a setting means for presetting a speed of operation of the robot. The operator teaches a robot by operating these input and setting means according to predetermined routines or procedures.

When robots operate to coat, sea, arc-weld, or otherwise work on workpieces, the posture of the end effectors of such robots with respect to the workpieces is of great importance.

Usually, after the position of an end effector has been determined, the posture of the end effector with respect to a workpiece is corrected. If the posture of the end effector is corrected by turning the end effector about the distal end of the robot arm, then the position of the tool center point of the end effector relative to the workpiece tends to vary. Therefore, when the posture of the end effector with respect to the workpiece is corrected in the above manner, the position of the tool center point must also be corrected.

In order to make the robot teaching process more efficient, there has been proposed a robot teaching process, as disclosed in Japanese Laid-Open Patent Publication No. 59-167713, wherein the position of the tool center point of an end effector and the posture or orientation of the end effector with respect to a workpiece are stored when teaching the robot, and the robot is subsequently played back by computing the positions of the articulations of the robot based on the stored position and posture data.

According to the disclosed robot teaching process, the positional data for the robot articulations are computed in order to correct the position of a displaced tool center point by varying the posture of the end effector. Therefore, it takes a long time to position the robot, and the speed at which the robot is moved when it is played back is low.

It can readily be understood that as many teaching points as possible should be employed in order to move a robot precisely along a desired path. However, the more the teaching points through which the robot must be guided, the longer the time needed to teach the robot. One solution to this problem is to automatically compute teaching data between two teaching points through linear or circular interpolation for welding a workpiece with an arc welding robot, for example.

The conventional interpolation process only interpolates positions for the tool center point, but does not take into account the posture or orientation of the end effector with respect to the workpiece. Therefore, it cannot perform a highly accurate job in cases where the orientation of the end effector is important, such as when coating or sealing a workpiece. If the posture of the end effector is varied at each interpolated point, then the speed of operation of the robot is greatly lowered.

If a different lot of workpieces are to be processed, or the robot is dismounted from the processing line for maintenance, the position of the tool center point of the robot with respect to a workpiece may be shifted. It would be considerably time-consuming if the robot were taught all over again. It has been proposed to correct the teaching data based on the teaching data prior to the changing of workpiece lots or the maintenance of the robot (see Japanese Laid-Open Patent Publication No. 60-95605).

The proposed process however does not take into consideration the posture of an end effector with respect to a workpiece in view of requirements for high-speed data correction. Therefore, when the configuration of workpieces or the position of a robot is largely changed, the posture of the end effector with respect to the workpiece is rendered inaccurate, making it impossible to effect highly accurate robot operation. The position of the tool center point may also be shifted when end effectors are changed due to a design modification.

SUMMARY OF THE INVENTION

It is a major object of the present invention to provide a robot teaching method which is capable of easily and accurately teaching an articulated robot while additionally taking into account the posture or orientation of the end effector of the robot with respect to the tool center point, and which is also capable of quickly and easily correcting teaching data when the position of the tool center point is shifted.

Another object of the present invention is to provide a method of teaching an articulated robot, including a plurality of articulations and an end effector having a tool center point, comprising the steps of: determining a coordinate transformation matrix for transforming coordinates between the articulations from condition data of the articulations; calculating a present position of the tool center point based on said coordinate transformation matrix; determining a moving vector from said present position of the tool center point to a next position thereof; thereafter determining a new coordinate transformation matrix for transforming coordinates between the articulations so that the posture of the end effector at the next position of the tool center point which is calculated based on said first-mentioned coordinate transformation matrix and said moving vector will coincide with the posture of the end effector at the present position of the tool center point; and calculating new condition data of the articulations from said new coordinate transformation matrix.

Still another object of the present invention is to provide a method of teaching an articulated robot including a plurality of articulations and an end effector having a tool center point, comprising the steps of: determining a coordinate transformation matrix for transforming coordinates between the articulations from condition data of the articulations; calculating a present position of the tool center point based on said coordinate transformation matrix; determining a rotation matrix with respect to a reference coordinate system for dispacing the posture of the end effector at the present position of the tool center point; thereafter determining a new coordinate transformation matrix for transforming coordinates between the articulations so that a new position of the too center point which is calculated based on said first-mentioned coordinate transformation matrix and said rotation matrix will coincide with the present position of the tool center point: and calculating new condition data of the articulations from said new coordinate transformation matrix.

Yet another object of the present invention is to provide a method of teaching an articulated robot including an end effector having a tool center point for effecting linear interpolation between first and second teaching points, said method comprising the steps of: determining an interpolating number for dividing the distance between the first and second teaching points at predetermined intervals; dividing a change in the position of the tool center point and a change in the posture of the end effector as the end effector moves from said first teaching point to said second teaching point, by said interpolating number to determining changes in the position of the tool center point and changes in the posture of the end effector between interpolating points between said first and second teaching points; and determining the positions of the tool center point and the postures of the end effector at the respective interpolating points by using said changes in the position of the tool oenter point and said changes in the posture of the end effector between said interpolating points.

Yet still another object of the present invention is to provide a method of teaching an articulated robot including an end effector having a tool center point for effecting circular interpolation between first, second, and third teaching points, said method comprising the steps of: determining the center and length of an arc extending from said first teaching point through said second teaching point to said third teaching point; determining an interpolating number for dividing said arc at predetermined intervals based on the length of the arc; determining an angle formed between a vector extending from said center to said first teaching point and a vector extending from said center to said third teaching point; dividing said angle by said interpolating number to determine a change in the direction of a vector extending from said center to an interpolating point; determining a rotation matrix for the vector extending to the interpolating point based on said change in the direction; and operating said rotation matrix successively on coordinate transformation matrices with respect to said first teaching point to determine the positions of the tool center point and the postures of the end effector at the respective interpolating points.

A further object of the present invention is to provide a method of teaching an articulated robot having a plurality of articulations and an end effector having a tool center point for correcting the position of the tool center point, comprising the steps of: determining a coordinate transformation matrix for transforming coordinates between the articulations from condition data of the articulations; calculating the position of the tool center point before it is corrected, based on said coordinate transformation matrix; determining an interval of movement of said tool center point with respect to a workpiece to be processed by said robot; calculating the position of the tool center point after it is corrected, from the position of the tool center point before it is corrected and said interval of movement; then determining a new coordinate transformation matrix for transforming coordinates between the articulations from the position of the tool center point after it is corrected; and calculating new condition data of the articulations from said new coordinate transformation matrix.

A still further object of the present invention is to provide a method of teaching an articulated robot including an end effector having a tool center point for correcting teaching data for the robot, comprising the steps of: determining the positions of three reference points which are not present on one straight line and are selected before the teaching data are corrected; determining three positions for the tool center point by moving the too center point to said three reference points when the teaching data are corrected; thereafter determining a coordinate transformation matrix to bring the positions of said three reference points into agreement with said three positions for the too center point; and operating said coordinate transformation matrix on the teaching data to correct the same.

A yet further object of the present invention is to provide a method of teaching the articulated robot, further comprising the step of determining said coordinate transformation matrix to bring a triangle having the positions of said three reference points at respective corners thereof into superposed relation to a triangle having said three positions for the tool center point at respective corners thereof.

A yet still further object of the present invention is to provide a method of teaching an articulated robot having a plurality of articulations and an end effector having a tool center point for replacing the end effector with a new end effector, comprising the steps of: determining a coordinate transformation matrix for transforming coordinates between the articulations from condition data of the articulations; calculating the position of the tool center point of the old end effector based on said coordinate transformation matrix and dimensional data of the old end effector; then determining a new coordinate transformation matrix for transforming coordinates between the articulations so that the position of the tool center point of the new end effector and the posture of the new end effector will coincide respectively with the position of the tool center point of the old end effector and the posture of the old end effector; and calculating new condition data of the articulations from said new coordinate transformation matrix.

The above and other objects, features and advantages of the present invention will become more apparent from the following description when taken in conjunction with the accompanying drawings. However, it should be understood that the detailed description and specific examples, while indicating preferred embodiments of the present invention, are given by way of illustrative example only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 5, 6, 7a, 7b, 8a, 8b, 10, 11a, 11b, and 13 are flowcharts of operation sequences of the robot teaching method of the present invention.

DETAILED DESCRIPTION OF THE PREFERRED EMBODIMENT

Figure 1:
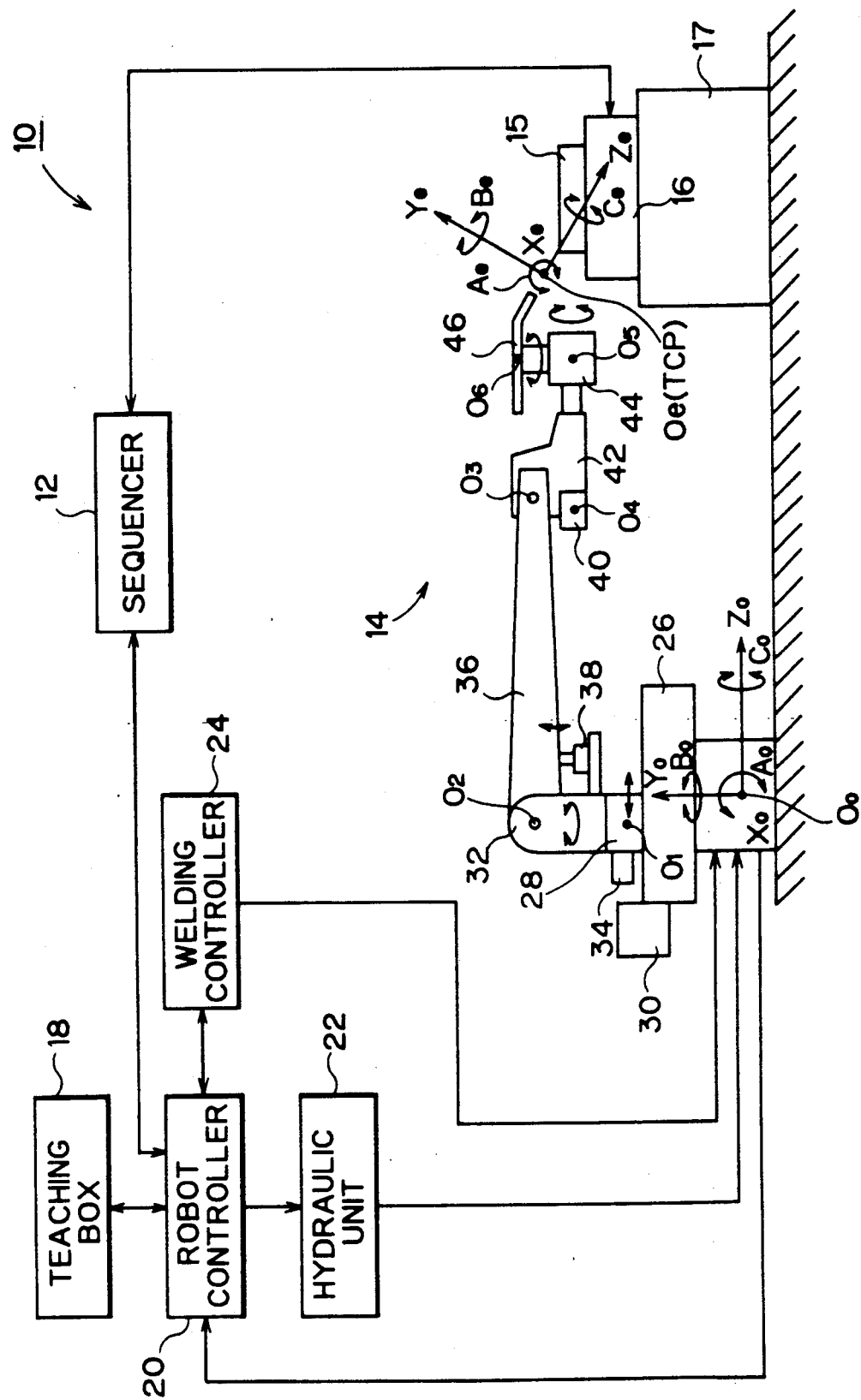
FIG. 1 is a schematic elevational view, partly in block form, of a welding system to which a robot teaching method according to the present invention is applicable.

FIG. 1 schematically illustrates, partly in block form, a welding system to which a robot teaching method according to the present invention is applicable.

The welding system, generally indicated at 10, includes an arc welding robot 14 which is operated under sequence control by a sequencer 12 for welding a workpiece 15 positioned on a jig 17 by a clamp unit 16. The arc welding robot 14 is taught its operation in advance by a teaching box 18, and controlled in its operation by a robot controller 20 through a hydraulic unit 22 and a welding controller 24.

The arc welding robot 14 is mounted on a base 26 and, includes a movable member 28 which is movably disposed on the base 26 and movable in the directions indicated by the arrows by a hydraulic motor 30 disposed on the base 26, and a swingable member 32 swingably mounted on the movable member 28 and swingable in the directions indicated by the arrows by a hydraulic motor 34 attached to the movable member 28. An arm 36 has an end pivotally coupled to the swingable member 32 and is vertically movable in the directions of the arrows by a hydraulic cylinder 38 supported by the swingable member 32. An attachment member 42 supporting a hydraulic motor 40 'is mounted on the other free end of the arm 36, and a welding torch 46 is coupled as an end effector to the attachment member 42 through a hydraulic motor 44. The welding torch 46 is rotatable by the hydraulic motor 40 in the directions indicated by the arrows about an axis of the hydraulic motor 44, and is also rotatable by the hydraulic motor 44 in the directions of the other arrows about another axis of the hydraulic motor 44. The hydraulic unit 22 controls operation of the hydraulic motors 30, 34, 40, 44 and the hydraulic cylinder 38. The welding controller 24 controls a welding electric current flowing between the the welding torch 46 and the workpiece 15.

The welding system 10 has various coordinate systems. There are a base coordinate system $O_0$ fixed to the base 26 with respect to the arc welding robot 14, a hand coordinate system $O_e$ fixed to the tool center point TCP of the welding torch 46 with respect to the workpiece 15, and coordinate systems $O_1$ through $O_6$ at the respective articulations of the arc welding robots 14.

The base coordinate system $O_0$ has three orthogonal axes $X_o$, $Y_o$, $Z_o$, with the directions of turning motion around these axes being represented by $A_o$, $B_o$, $C_o$, respectively. The hand coordinate system $O_e$ has three orthogonal axes $X_e$, $Y_e$, $Z_e$, with the directions of turning motion around these axes being represented by $A_e$, $B_e$, $C_e$, respectively. The coordinate system $O_1$ is displaceable with respect to the base coordinate system $O_0$ by the hydraulic motor 30. The coordinate system $O_2$ is angularly movable with respect to the coordinate system $O_1$ by the hydraulic motor 34. The coordinate system $O_3$ is angularly movable with by the coordinate system $O_2$ with respect to the hydraulic cylinder 38. The coordinate system $O_4$ is fixed with respect to the coordinate system $O_3$ and added to explain the arc welding robot 14 as a 6-axis robot. The coordinate system $O_5$ is angularly movable with respect to the coordinate system $O_4$ by the hydraulic motor 40. The coordinate system $O_6$ is angularly movable with respect to the coordinate system $O_5$ by the hydraulic motor 44.

Figure 2:
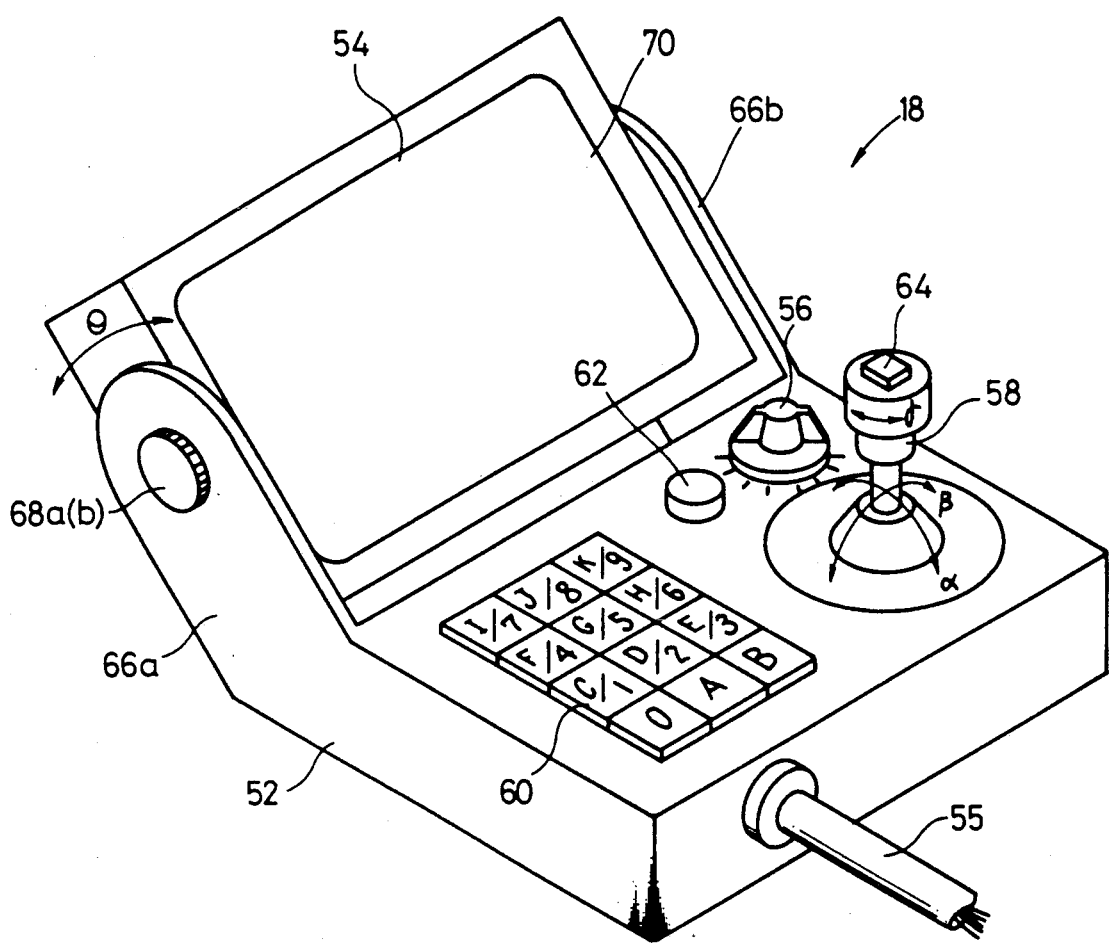
FIG. 2 is a perspective view of a teaching box of the welding system shown in FIG. 1.

The teaching box 18 is arranged as shown in FIG. 2. The teaching box 18 essentially comprises a main body 52 as a control means for teaching the arc welding robot 14, and a display 54 for displaying procedures or modes of operation of the teaching box 18.

The main body 52 is electrically connected to the robot controller 20 through a cable 55. The main body 52 has on its upper panel a mode selection switch 56 for switching between a teaching mode, a playback mode, and other modes, a joystick 58 for manually operating the arc welding robot 14, a ten-key pad 60 for selecting functions and entering data, and an emergency stop button 62 for stopping operation of the arc welding robot 14 in an emergency. Keys "O" and "I" of the ten-key pad 60 are used to store teaching data. The joystick 58 is tiltable in the directions indicated by the arrows $\alpha$, $\beta$, and also rotatable in the directions indicated by the arrows $\gamma$. The relationship between the direction in which the joystick 58 is tilted or rotated and the direction in which the arc welding robot 14 is operated can be determined through the ten-key pad 78. The speed of operation of the arc welding robot 14 is selected by the angle through which the joystick 58 is tilted or rotated. A push-button operation switch 64 is mounted on the upper end of the joystick 58 and can be depressed to start operating of arc welding robot 14.

The main body 52 has two laterally spaced arms 66a, 66b projecting obliquely upwardly. The display 54 is angularly movably supported between the distal ends of the arms 66a, 66b by attachment screws 68a, 68b, the display 54 being angularly movable about the screws 68a, 68b in the directions indicated by the arrows $\theta$. The display 54 has an LCD 70 which displays a procedure of operation of the teaching box 18 which has been selected by the mode selection switch 56 and the ten-key pad 60.

The welding system 10 to which the robot teaching method of the present invention is applicable is basically constructed as described above. The robot teaching method of the invention, applied to the welding system 10, will hereinafter be described.

First, the power supply of the teaching box 18 is turned on. The LCD 70 of the teaching box 18 then displays a main menu 80 shown in FIG. 3. The main menu 80 includes "TEACH" which indicates a teaching mode for teaching the arc welding robot 14 by using the joystick 58, "PLAY" which indicates a playback mode for fetching desired teaching data by using a keyboard or the like (not shown) couped to the robot controller 20 and for operating the arc welding robot 14 according the teaching data, "AUTO" which indicates an automatic mode for automatically executing the playback mode based on a request from the sequencer 12 to actually weld the workpiece 15 with the arc welding robot 14, "EDIT" which indicates an editing mode for editing (i.e., three-dimensionally shifting, copying, or the like) teaching data stored in the teaching box 18, and "PARA" which indicates a parameter setting mode for setting certain parameters such as dimensions of the welding torch 46 of the arc welding robot 14. These "TEACH", "PLAY", "AUTO", "EDIT", and "PARA" modes can be selected by turning the mode selection switch 56 to respective positions "1", "2", "3", "4", and "5".

Then, the operator selects the parameter setting mode from the displayed main menu 80 by turning the mode selection switch 56 to position "5". Using the ten-key pad 60 of the teaching box 18, the operator enters the dimensions of the welding torch or end effector 46 and servo gains for potentiometers associated with the respective articulations of the arc welding robot 14, and sets maximum allowable speeds of operation of the articulations of the arc welding robot 14.

Figure 4:
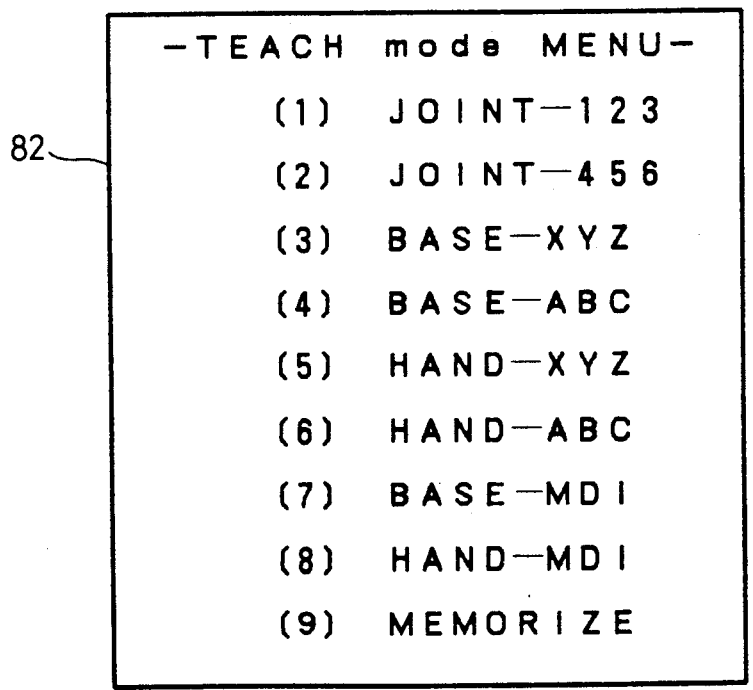

The operator thereafter turns the mode selection switch 56 to position "1" to select the teaching mode. The LCD 70 now displays a teaching mode menu 82 shown in FIG. 4.

The teaching mode menu 82 includes "JOINT-123" which indicates a mode for operating the hydraulic motors 30, 34 and the hydraulic cylinder 38 in response to movements of the joystick 58 in the directions indicated by the arrows $\alpha$, $\beta$, $\gamma$, and "JOINT-456" which indicates a mode for operating the hydraulic motors 40, 44 in response to movements of the joystick 58 in the directions indicated by the arrows $\alpha$, $\beta$. The teaching mode menu 32 also includes "BASE-XYZ" which indicates a mode for moving the tool center point TCP of the welding torch 46 in the directions along the axes Xo, Yo, Zo of the base coordinate system Oo in response to movement of the joystick 58, "BASE-ABC" which indicates a mode for moving the tool center point TCP of the welding torch 46 in the directions Ao, Bo, Co around the axes Xo, Yo, Zo of the base coordinate system Oo in response to movement of the joystick 58, "HAND-XYZ" which indicates a mode for moving the tool center point TCP of the welding torch 46 in the directions along the axes Xe, Ye, Ze of the hand coordinate system Oe in response to movement of the joystick 58, and "HAND-ABC" which indicates a mode for moving the tool center point TCP of the welding torch 46 in the directions Ae, Be, Ce around the axes Xe, Ye, Ze of the hand coordinate system Oe in response to movement of the joystick 58. The teaching mode menu 32 further includes "BASE-MDI" and "HAND-MDI" which are modes for moving the tool center point TCP of the welding torch 46 based on teaching data entered based on the base and hand coordinate systems Oo, Oe, respectively, and "MEMORIZE" which indicates a mode for storing the present conditions of the arc welding robot 14 as teaching data into a memory (not shown) in the robot controller 20. These modes can be selected by depressing the keys of the ten-key pad 60 which bear the corresponding numerals and letter shown in FIG. 4.

If the numeral "3" is entered through the ten-key pad 60, then the "BASE-XYZ" mode is selected from the teaching mode menu. Then, while depressing the operation switch 64, the operator tilts or turns the joystick 58 in the direction indicated by the arrow $\alpha$, $\beta$, or $\gamma$ through a certain interval. Data on the directions and angles in which the joystick 58 is tilted and turned are transferred over the cable 55 to the robot controller 20 Based on the selected "BASE-XYZ" mode, the robot controller 20 generates, from the direction and angle data, pulse signals corresponding to distances of movement in the coordinate systems $O_1$ through $O_6$ of the arc welding robot 14, and applies the generated pulse signals to the hydraulic unit 22. In response to the applied pulse signals, the hydraulic unit 22 moves the tool center point TCP of the welding torch 46 to a desired welding position on the workpiece 15 according to the base coordinate system Oo. At this time, the tool center point TCP is moved in the direction along the axis Zo by tilting the joystick 58 in the direction indicated by the arrow $\alpha$, in the direction along the axis Xo by tilting the joystick 58 in the direction indicated by the arrow $\beta$, and in the direction along the axis Yo by turning the joystick 58 in the direction indicated by the arrow $\gamma$.

If the workpiece 15 is to be welded along a path lying in one plane and having a certain length, then it is necessary not only to keep the position of the tool center point TCP of the welding torch 46 accurately with respect to the workpiece 15 but also to keep the posture or orientation of the welding torch 46 constant with respect to the workpiece 15 in order to arc-weld the workpiece 15 accurately. In the "BASE-XYZ" mode, the tool center point TCP of the welding torch 46 can be moved to a desired position while holding the posture of the welding torch 46 constant based on the base coordinate system Oo. Such translation of the welding torch 46 will be described below with reference to the flowchart of FIG. 5.

First, the robot controller 20 receives pulses Pi (i=1, 2, ..., 6) representing the present position from the non-illustrated potentiometers mounted on the hydraulic motors 30, 34, 40, 44 and the hydraulic cylinder 38 of the arc welding robot 14. In this embodiment, no potentiometer is associated with the coordinate system $O_4$, and the pulses $P_4$ are set to zero since the coordinate system $O_4$ is fixed with respect to the coordinate system $O_3$. Then, the robot controller 20 determines, from the received pulses Pi, present angles $r_i$ of the respective articulations with respect to the adjacent coordinate systems $O_1$ through $O_6$ according to the following equation:

$$r_i = \left( \frac{P_i}{k_{1i}} + k_{2i} \right) \cdot k_{3i} \quad (1)$$

$$(i = 1, 2, \ldots 6)$$

in a step 1a, where $k_{1i}$ indicates parameters relating to the resolution and speed reduction ratio of the potentiometers in the coordinate systems Oi, $k_{2i}$ indicates offsets, i.e., increases or reductions, of the pulses Pi produced by the potentiometers from reference intermediate points set with respect to the ranges in which the articulations in the coordinate systems Oi are movable, and $k_{3i}$ represents parameters used for converting the angles (degree) to angles in radians.

Then, transformation matrices T are calculated from the present angles ri calculated according to the equation (1) in a step 2a. The transformation matrices T are used to set the positions and postures of the coordinate systems Oi with respect to the base coordinate system Lo. With the elements of the transformation matrices T being indicated by $t_{mn}$ (m=1, 2, 3, n=1, 2, 3, 4), the transformation matrices T are given by:

$$T = \begin{pmatrix} t_{11}(r_i) & \cdots & t_{14}(r_i) \\ \cdot & & \cdot \\ \cdot & & \cdot \\ \cdot & & \cdot \\ t_{31}(r_i) & \cdots & t_{34}(r_i) \\ 0 & \cdots & 1 \end{pmatrix} \quad (2)$$

$(i = 1, 2, \ldots 6)$

If the transformation matrices T are defined as $$T = [a|b] \ldots \quad (3)$$

then, the present position C of the tool center point TCP is calculated, using the transformation matrices T, as follows:

$$C = T \cdot h = a \cdot h_o + b \ldots \quad (4)$$

in a step 3a, where a indicates the elements in four rows and three columns on the lefthand side of the transformation matrices T and b indicates the elements in four rows and one column on the righthand side of the transformation matrices T, and h indicates a vector representing the offset of the tool center point TCP with respect to the coordinate system $O_6$. The vector h is defined as $$h = \begin{pmatrix} h_1 \\ h_2 \\ h_3 \\ 1 \end{pmatrix} = \begin{pmatrix} h_o \\ 1 \end{pmatrix} \quad (5)$$

where $h_1, h_2, h_3$ are the vector components in the directions $X_o, Y_o, Z_o$ of the base coordinate system $O_o$.

The robot controller 20 determines whether there is an input from the joystick 58 of the teaching box 18 in a step 4a, and holds the present pulses Pi if there is no such input in a step 5a.

When the joystick 58 is tilted or turned a certain interval along the directions $\alpha, \beta, \gamma$ while the operation switch 64 is being depressed, the robot controller 20 calculates intervals $\Delta c_j$ of movement of the respective articulations along the axes $X_o, Y_o, Z_o$ of the base coordinate system $O_o$ based on voltage signals $\Delta V_j$ from the potentiometers which are electrically coupled to the joystick 58. It is assumed that the potentiometers have gains $g_j$, and the intervals $\Delta c_j$ are given by:

$$\Delta c_j = \frac{\Delta V_j}{g_j} \quad (j = 1, 2, 3) \quad (6)$$

in a step 6a. The calculated value when $j=1$ indicates the interval along the axis $X_o$, the calculated value when $j=2$ indicates the interval along the axis $Y_o$, and the calculated value when $j=3$ indicates the interval along the axis $Z_o$.

A new position C' of the tool center point TCP is then determined by using the calculated intervals $\Delta c_j$ in a step 7a. More specifically, the new position C' of the tool center point TCP which has been moved by the joystick 58 is given, using the equation (6), as follows:

$$c_j' = c_j - \Delta c_j / k_4 \ldots \quad (7)$$

$(j = 1, 2, 3)$ where $c_j$ indicates the components in the present position C, $c_j'$ indicates the components in the new position C', and $k_4$ is a parameter relating to the resolution and speed reduction ratio of a potentiometer (not shown) of the joystick 58.

If transformation matrices T' when the tool center point TCP is moved to the position C' are given by:

$$T' = [a'|b'] \ldots \quad (8)$$

then it is necessary from the equation (3) that $$a = a' \ldots \quad (9)$$

in order for the posture of the end effector to remain unchanged or fixed when the tool center point TCP moves from the position C to the position C'. Therefore, the new position C' of the tool center point TCP is expressed as:

$$C' = a \cdot h_o + b' \ldots \quad (10)$$

and the transformation matrices T' are determined as:

$$T' = [a|C' - a \cdot h_o] \ldots \quad (11)$$

in a step 8a.

By inversely transforming the transformation matrices T', next angles $r_i'$ ($i = 1, 2, \ldots 6$) in the articulations associated with the respective coordinate systems $O_1$ through $O_6$ can be determined in a step 9a. As a result, next pulses Pi' are determined from the angles $r_i'$ as follows:

$$P_i' = \left( \frac{r_i'}{k_{3i}} + k_{2i} \right) \cdot k_{1i} \quad (12)$$

$(i = 1, 2, \ldots 6)$ in a step 10a.

Then, the robot controller 20 supplies the pulses Pi' determined in the step 10a to the hydraulic unit 22 to instruct the arc welding robot 14 to move in a step 11a. The position of the tool center point TCP of the welding torch 46 of the arc welding robot 14 is now varied depending on the interval by which the joystick 58 is tilted or turned, while the posture of the welding torch 46 at the tool center point TCP remains fixed or unchanged. Then, "0" and "I" are entered in a step 12a from the ten-key pad 60 of the teaching box 18 to store the pulses Pi' for the respective articulations as teaching data in a memory (not shown) in the robot controller 20 in the "MEMORIZE" mode. The key "0" is depressed in order to select the letter "I" on the "I/7" key.

By repeating the above process for each of desired welding spots, the tool center point TCP of the welding torch 46 is translated to a desired position on the workpiece 15.

While the tool center point TCP is translated with reference to the base coordinate system $O_o$ in the above embodiment, it is also possible to translate the tool center point TCP with reference to the hand coordinate system $O_e$ defined at the tool center point TCP. In this case, the operator selects the "HAND-XYZ" mode from the teaching mode menu 82 displayed on the LCD 70, and tilts or turns the joystick 58 in a desired direction. The tool center point TCP is now changed in position with reference to the hand coordinate system Oe fixed at the tool center point TCP. The operator can teach the arc welding robot 14 more easily than if the base coordinate system Lo is employed. In this procedure, after the intervals of movement along the axes Xe, Ye, Ze of the hand coordinate system Oe have been set in the step 6a of FIG. 5, these intervals are converted to intervals $\Delta c_j$ (see the equation (6)) as viewed from the base coordinate system Oo, and then the step 7a and the subsequent steps are executed, for obtaining desired pulses for the respective articulations.

In order to accurately arc-weld the workpiece 15, it may be desired to vary the posture of the welding torch 46 at any teaching point. In this instance, the position of the welding torch 46 must also be accurately defined with respect to the workpiece 15. According to the embodiment of the present invention, after the position of the tool center point TCP of the welding torch 46 has been established based on the "BASE-XYZ" mode in the teaching mode menu, the posture of the welding torch 46 is varied in the "BASE-ABC" mode while fixing the position of the tool center point TCP. A process of varying the posture of the welding torch 46 will be described below with reference to the flowchart shown in FIG. 6.

The operator selects the "BASE-ABC" mode from the teaching mode menu displayed on the LCD 70. Then, while depressing the operation switch 64, the operator tilts or turns the joystick 58 to vary the posture of the welding torch 46. In the "BASE-ABC" mode, the welding torch 46 is varied in posture at the tool center point TCP on the distal end of the welding torch 46 with reference to the base coordinate system Oo.

The robot controller 20 receives present pulses Pi (i=1, 2, ... 6) from the potentiometers associated with the articulations, and determines, from the received pulses Pi, present angles $r_i$ of the respective articulations with respect to the adjacent coordinate systems $O_1$ through $O_6$ according to the equation (1) in a step 1b.

Then, transformation matrices T are calculated from the present angles ri according to the equation (2) in a step 2b. The transformation matrices T are used to calculate the present position C of the tool center point TCP according to the equation (4) in a step 3b.

The robot controller 20 determines whether there is an input from the joystick 58 of the teaching box 18 in a step 4b, and holds the present pulses Pi if there is no such input in a step 5b.

When the joystick 58 is tilted or turned while the operation switch 64 is being depressed, the robot controller 20 calculates changes $\Delta r_j$ in the intervals of movement of the respective articulations around the axes Xo, Yo, Zo of the base coordinate system Oo based on voltage signals $\Delta V_j$ from the potentiometers which are electrically coupled to the joystick 58. It is assumed that the potentiometers have gains $g_j$, and the changes in the intervals $\Delta r_j$ are given by:

$$\Delta r_j = \frac{\Delta V_j}{g_j} \quad (j = 1, 2, 3) \tag{13}$$

in a step 6b. The calculated value when j=1 indicates the interval Ao around the axis Xo, the calculated value when j=2 indicates the interval Bo around the axis Yo, and the calculated value when j=3 indicates the interval Co around the axis Zo.

Then, a rotation matrix R with respect to the base coordinate system Oo is determined from the changes $\Delta r_j$ in the intervals around the axes Xo, Yo, Zo of the base coordinate system Oo in a step 7b. The rotation matrix R is given by:

$$R = R_3 \cdot R_2 \cdot R_1 \ldots \tag{14}$$

where $R_1$, $R_2$, $R_3$ are rotation matrices with respect to the directions Xo, Yo, Zo and expressed as:

$$Rj = \begin{pmatrix} R_{11}(\Delta r_j) & \cdots & R_{13}(\Delta r_j) & 0 \\ \cdot & & \cdot & \cdot \\ \cdot & & \cdot & \cdot \\ \cdot & & \cdot & \cdot \\ R_{31}(\Delta r_j) & \cdots & R_{33}(\Delta r_j) & 0 \\ 0 & \cdots & 0 & 1 \end{pmatrix} \tag{15}$$

$(j = 1, 2, 3)$ where Rmn (m, n=1, 2, 3) are the components of the rotation matrices Rj.

Then, a new position of the too center point TCP is determined in a step 8b by using the transformation matrices T, R calculated in the steps 2b, 7b. More specifically, the new position C' of the tool center point TCP with the welding torch 46 varied in posture by the joystick 58 is determined by operating the rotation matrix R on the equation (4) as follows:

$$C' = R \cdot T \cdot h = R - C \ldots \tag{16}$$

In order for the position C' of the tool center point TCP to remain unchanged with respect to the change in the posture of the welding torch 46 at the tool center point TCP thereof, it is necessary that:

$$R \cdot C = C' = C \ldots \tag{17}$$

Therefore, by operating the rotation matrix R on the equation (4) from its lefthand side, transformation matrices T' when only the posture of the welding torch 46 is varied are determined as:

$$T' = [R \cdot a | C - R \cdot a \cdot h_o] \ldots \tag{18}$$

in a step 9b.

By inversely transforming the transformation matrices T', next angles $r_i'$ (i=1, 2, ... 6) in the articulations associated with the respective coordinate systems $O_1$ through $O_6$ can be determined in a step 10b. As a result, next pulses Pi' are determined from the angles $r_i'$ according to the equation (12) above in a step 11b.

Then, the robot controller 20 supplies the pulses Pi' determined in the step 11b to the hydraulic unit 22 to instruct the arc welding robot 14 to move in a step 12b. The posture of the welding torch 46 of the arc welding robot 14 is now varied depending on the interval by which the joystick 58 is tilted or turned, while the position of the tool center point TCP remains fixed or unchanged. Then, "0" and "I" are entered from the ten-key pad 60 of the teaching box 18 to store the pulses Pi' for the respective articulations as teaching data in the memory (not shown) in the robot controller 20 in a step 13b.

By repeating the above process for each of desired welding spots, the welding torch 46 is accurately set at a desired posture with respect to the workpiece 15.

While the posture of the welding torch 46 is varied with reference to the base coordinate system Oo in the above embodiment, it is also possible to vary the posture of the welding torch 46 with reference to the hand coordinate system Oe defined at the tool center point TCP. In this case, the operator selects the "HAND-ABC" mode from the teaching mode menu 82 displayed on the LCD 70, and tilts or turns the joystick 58 in a desired direction. Since the welding torch 46 is now varied in posture with reference to the hand coordinate system Oe fixed at the tool center point TCP, the operator can teach the arc welding robot 14 more easily than if the base coordinate system Lo is employed. In this procedure, after changes in the intervals of movement around the axes Xe, Ye, Ze of the hand coordinate system Oe have been set in the step 6b of FIG. 6, these interval changes are converted to interval changes $\Delta r_j$ (see the equation (13)) as viewed from the base coordinate system Oo, and then the step 7b and the subsequent steps are executed, for obtaining desired pulses for the respective articulations.

Then, the operator establishes a process of interpolation between teaching points and a speed of movement of the tool center point TCP of the welding torch 46 after the teaching data have been stored.

The process of arc-welding the workpiece while generating new teaching data by effecting linear interpolation between two teaching points will hereinafter be described with reference to the flowchart shown in FIGS. 7a and 7b.

The robot controller 20 reads pulses PSi from the potentiometers of the respective articulations at a start point, and pulses PEi from the potentiometers of the articulations at an end point (i=1, 2, ... 6), the start and end points being two teaching points, respectively, and a speed v of movement between these teaching points from a memory (not shown) in a step 1c. Then, angles $rs_i$, $re_i$ of the articulations with respect to the adjacent coordinate systems $O_1$ through $O_6$ are determined from these pulses PSi, PEi as follows:

$$rs_i = \left( \frac{PSi}{k_{1i}} + k_{2i} \right) \cdot k_{3i} \quad (19)$$

$$re_i = \left( \frac{PEi}{k_{1i}} + k_{2i} \right) \cdot k_{3i} \quad (20)$$

$(i = 1, 2, \ldots 6)$ in a step 2c, where $k_{2i}$ indicates offsets, i.e., increases or reductions, of the pulses PSi, PEi produced by the potentiometers from reference intermediate points set with respect to the ranges in which the articulations in the coordinate systems Oi are movable. Since the coordinate system O4 is fixed with respect to the coordinate system $0_o$, as described above, the pulses PS4, PE4 are set to zero.

Then, transformation matrices Ts, Te are calculated from the angles $rs_i$, $re_i$ at the start and end points, according to the equations (19), (20). The transformation matrices Ts, Te are used to set the positions and postures of the coordinate systems Oi with respect to the base coordinate system Lo. With the elements of the transformation matrices Ts, Te being indicated by $t_{mn}$ (m=1, 2, 3, n=1, 2, 3, 4), the transformation matrices Ts, Te are given by:

$$Ts = \begin{pmatrix} t_{11}(rs_i) & \cdots & t_{14}(rs_i) \\ \cdot & & \cdot \\ \cdot & & \cdot \\ t_{31}(rs_i) & \cdots & t_{34}(rs_i) \\ 0 & \cdots & 1 \end{pmatrix} \quad (21)$$

$$Te = \begin{pmatrix} t_{11}(re_i) & \cdots & t_{14}(re_i) \\ \cdot & & \cdot \\ \cdot & & \cdot \\ t_{31}(re_i) & \cdots & t_{34}(re_i) \\ 0 & \cdots & 1 \end{pmatrix} \quad (22)$$

$(i = 1, 2, \ldots 6)$

Therefore, using the transformation matrices Ts, Te, a position Cs of the tool center point TCP at the start point and a position Ce of the tool center point TCP at the end point are calculated in a step 3c as follows:

$$Cs = Ts \cdot h \ldots \quad (23)$$

$$Ce = Te \cdot h \ldots \quad (24)$$

Then, the distance l of linear movement of the too center point TCP between the start and end points is determined in a step 4c. The linear distance l is expressed from the equations (23), (24) as follows:

$$l = \| Cs - Ce \| \ldots \quad (25)$$

Intervals $d_i$ of movement of the respective articulations for moving the tool center point TCP from the start point to the end point are calculated, using the equations (19), (20), as follows:

$$d_i = rs_i - re_i \ldots \quad (26)$$

in a step 5c. Times $t_i$ required to move the articulations for the intervals di at a maximum allowable speed $v_{Mi}$ set in the parameter setting mode are determined by:

$$t_i = d_i / v_{Mi} \ldots \quad (27)$$

$(i = 1, 2, \ldots 6)$ in a step 6c. Assuming that the maximum time of the times $t_i$ determined by the equation (27) is $t_M$ and the time interval for supplying data from the robot controller 20 to the hydraulic unit 22 is T, the number $N_1$ of interpolating points when the articulation that takes the longest time is moved between the start and end points at the maximum allowable speed $v_{Mi}$ is given by:

$$N_1 = T_M / T \ldots \quad (28)$$

in a step 7c. The number $N_2$ of interpolating points when the tool center point TCP is moved between the start and end points at a maximum speed $v_{MAX}$ at which the arc welding robot 14 can be operated, is determined in a step 8c, using the linear distance l determined by the equation (25), as follows:

$$N_2 = l \cdot T / v_{MAX} \ldots \quad (29)$$

The larger one of these interpolating numbers $N_1$, $N_2$ is selected as an interpolating number $N_3$ in a step 9c. Finally, an interpolating number N for an actual operation is determined in a step 10c from a speed v of movement of the tool center point TCP, specified in the parameter setting mode, and the interpolating number $N_3$ determined in the step 9c, as follows:

$$N = N_3 \times \frac{v_{MAX}}{v} \tag{30}$$

By setting the interpolating number N in the manner described above, maximum interpolating data capable of being processed by the robot controller 20 can be generated, and hence the arc welding robot 14 can weld the workpiece 15 highly accurately.

Based on the interpolating number N thus defined, a change in the posture of the welding torch 46 and a change in the position of the tool center point TCP for each item of interpolating data from the start point to the end point are determined in a step 11c. Changes $\Delta r_i$ in the postures of the respective articulations are given from the equations (19), (20) and (30) by:

$$\Delta r_i = (rs_i - re_i)/N \ldots \tag{31}$$

Changes AC in the position of the tool center point TCP are given from the equations (23), (24) by:

$$\Delta C = (Cs - Ce)/N \ldots \tag{32}$$

Therefore, the positions Cn of the articulations at an interpolating point next to the start point are expressed by:

$$Cn = Cs + \Delta C \ldots \tag{33}$$

If transformation matrices Tn with respect to this interpolating point are defined as:

$$Tn = [a \ (rs_i + \Delta r_i) | b] \ldots \tag{34}$$

then the transformation matrices Tn are determined, using the relationship expressed by the equation (5), as follows:

$$Tn = [a \ | Cn - a \cdot h_0] \ldots \tag{35}$$

in a step 12c, where a indicates the elements in four rows and three columns on the lefthand side of the transformation matrices Tn and b indicates the elements in four rows and one column on the righthand side of the transformation matrices Tn.

By inversely transforming the transformation matrices Tn, next angles $rn_i$ (i = 1, 2, ... 6) in the articulations with respect to the interpolating point can be determined in a step 13c. Pulses PNi with respect to the interpolating point are determined from the angles $r_{ni}$ as follows:

$$PNi = \left( \frac{rn_i}{k_{3i}} - k_{2i} \right) \cdot k_{1i} \tag{36}$$

in a step 14c.

Then, the robot controller 20 applies the pulses PNi to the arc welding robot 14 to move the tool center point TCP to the interpolating point in a step 15c. Likewise, the steps 12c through 15c are repeated as many times a the interpolating number N to effect linear interpolation between the start and end points.

For moving the tool center point TCP of the welding torch 46 along a curve on the workpiece, teaching points are selected at certain intervals along the curve, and data for indicating circular interpolation are added to the data of middle and end points of the three adjacent teaching points. Circular interpolation data are generated between the teaching points in the manner described below.

Figure 8A:
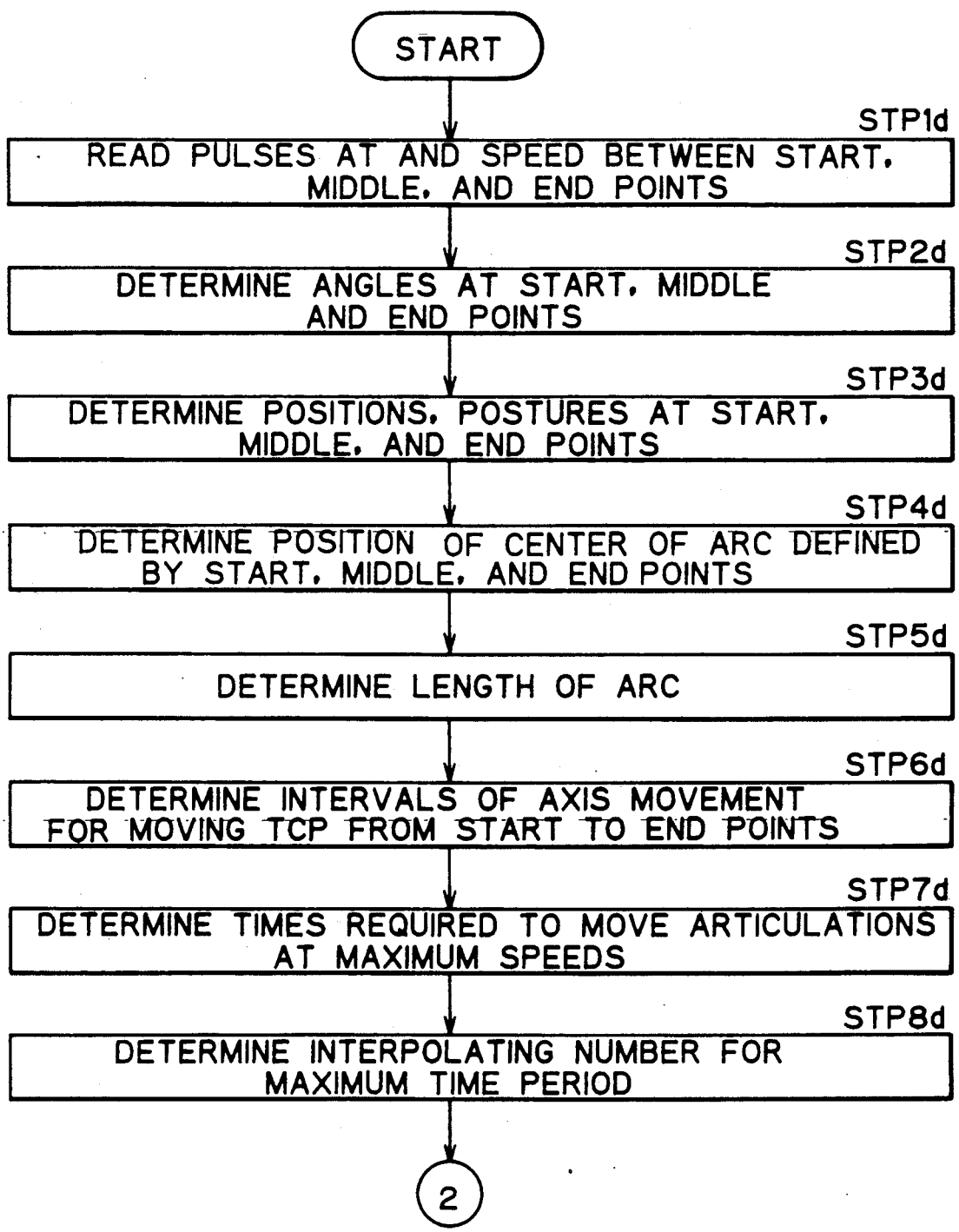
Figure 9:
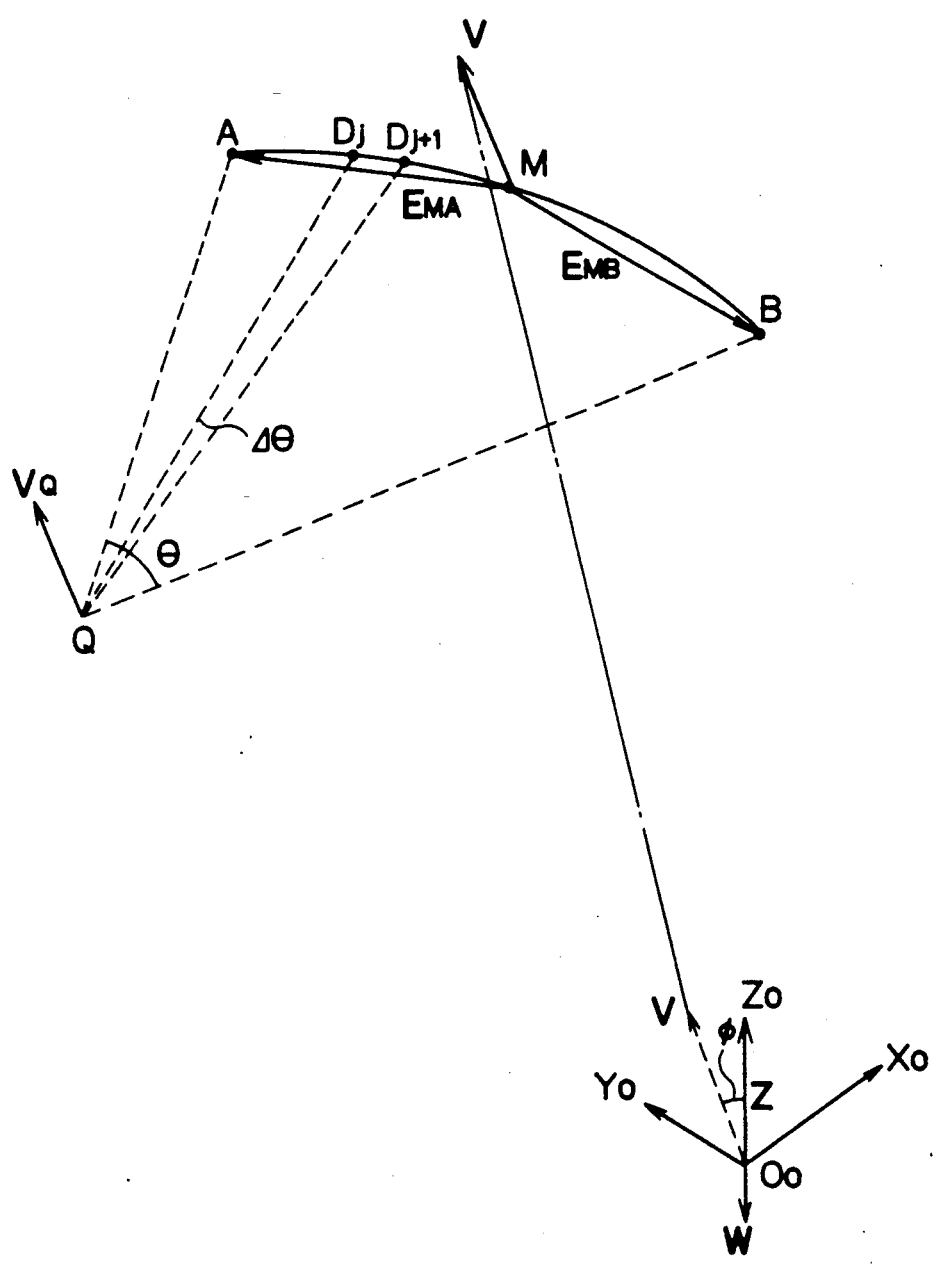
FIGS. 9, 12a, 12b, and 12c are diagrams illustrating the robot teaching method of the present invention.

The process of arc-welding the workpiece while generating new teaching data by effecting circular interpolation between teaching points will hereinafter be described with reference to the flowchart shown in FIGS. 8a and 8b and the flowchart shown in FIG. 9.

The robot controller 20 reads pulses PAi, PMi, PBi (i = 1, 2, ... 6) from the potentiometers of the articulations at three teaching points, i.e., a start point A, a middle point M, and an end point B, and also reads a speed v of movement between these teaching points from a memory (not shown) in a step 1d. Then, angles $ra_i$, $rm_i$, $rb_i$ of the articulations with respect to the adjacent coordinate systems $O_1$ through $O_6$ are determined from the pulses PAi, PMi, PBi as follows:

$$ra_i = \left( \frac{PAi}{k_{1i}} + k_{2i} \right) \cdot k_{3i} \tag{37}$$

$$rm_i = \left( \frac{PMi}{k_{1i}} + k_{2i} \right) \cdot k_{3i} \tag{38}$$

$$rb_i = \left( \frac{PBi}{k_{1i}} + k_{2i} \right) \cdot k_{3i} \tag{39}$$

$(i = 1, 2, \ldots 6)$ in a step 2d, where $k_{2i}$ indicates offsets, i.e., increases or reductions, of the pulses PAi, PMi, PBi produced by the potentiometers from reference intermediate points set with respect to the ranges in which the articulations in the coordinate systems Oi are movable. Since the coordinate system $O_4$ is fixed with respect to the coordinate system $O_3$, as described above, the pulses $PA_4$, $PM_4$, $PB_4$ are set to zero.

Then, transformation matrices Ta, Tm, Tb are calculated from the angles $ra_i$, $rm_i$, $rb_i$ of the articulations calculated according to the equations (37) through (39). The transformation matrices Ta, Tm, Tb are used to set the positions and postures of the coordinate systems Oi with respect to the base coordinate system Lo. With the elements of the transformation matrices Ta, Tm, Tb being indicated by tmn (m = 1, 2, 3, n = 1, 2, 3, 4), the transformation matrices Ta, Tm, Tt, are given by:

$$Ta = \begin{pmatrix} t_{11}(ra_i) & \cdots & t_{14}(ra_i) \\ \cdot & & \cdot \\ \cdot & & \cdot \\ \cdot & & \cdot \\ t_{31}(ra_i) & \cdots & t_{34}(ra_i) \\ 0 & \cdots & 1 \end{pmatrix} \tag{40}$$

$$Tm = \begin{pmatrix} t_{11}(rm_i) & \cdots & t_{14}(rm_i) \\ \cdot & & \cdot \\ \cdot & & \cdot \\ \cdot & & \cdot \\ t_{31}(rm_i) & \cdots & t_{34}(rm_i) \\ 0 & \cdots & 1 \end{pmatrix} \quad (41)$$

$$Tb = \begin{pmatrix} t_{11}(rb_i) & \cdots & t_{14}(rb_i) \\ \cdot & & \cdot \\ \cdot & & \cdot \\ \cdot & & \cdot \\ t_{31}(rb_i) & \cdots & t_{34}(rb_i) \\ 0 & \cdots & 1 \end{pmatrix} \quad (42)$$

$(i = 1, 2, \ldots 6)$

Therefore, using the transformation matrices Ta, Tm, Tb a position A of the tool center point TCP at the start point A, a position M thereof at the middle point M, and a position B thereof at the end point B are calculated in a step 3d as follows:

$$A = Ta \cdot h \ldots \quad (43)$$

$$M = Tm \cdot h \ldots \quad (44)$$

$$B = Tb \cdot h \ldots \quad (45)$$

Then, the position Q of the center Q of an arc passing through the start point A, the middle point M, and the end point B is determined in a step 4d. A vector $E_{MA}$ from the middle point M to the start point A and a vector $E_{MB}$ from the middle point M to the end point B are expressed by:

$$E_{MA} = A - M \ldots \quad (46)$$

$$E_{MB} = B - M \ldots \quad (47)$$

By using these vectors $E_{MA}$, $E_{MB}$, a vector V normal to the plane of a sector AMBQ is determined as follows:

$$V = E_{MA} \times E_{MB} \ldots \quad (48)$$

Then, an angle $\phi$ formed between the vector V determined by the equation (48) and a vector Z parallel to the axis Zo of the base coordinate system Oo is determined. A vector W normal to the vectors V, Z is then determined as follows:

$$W = V \times Z \ldots \quad (49)$$

A rotation matrix R$\phi$ around the vector W is determined from the angle $\phi$. Then, by using the rotation matrix R$\phi$, vectors $E_{MA}^*$, $E_{MB}^*$ produced by rotating the vectors $E_{MA}$, $E_{MB}$ around the vector W are determined as follows:

$$E_{MA}^* = R\phi \cdot E_{MA} \ldots \quad (50)$$

$$E_{MB}^* = R\phi \cdot E_{MB} \ldots \quad (51)$$

In this case, the sector AMBQ is rotated through the angle $\phi$ about the middle point M around the vector W until it becomes parallel to the plane Xo—Yo of the base coordinate system Oo. Therefore, a vector $E_{MQ}^*$ from the middle point M toward the new center Q* of the sector AMBQ which has been rotated can easily be calculated two-dimensionally. The vector $E_{MQ}$ from the middle point M to the center Q is determined, using an inverse matrix of the rotation matrix R$\phi$ and the vector $E_{MQ}^*$, as:

$$E_{MQ} = R\phi^{-1} \cdot E_{MQ}^* \ldots \quad (52)$$

As a consequence, the position Q of the center Q is given as:

$$Q = M + E_{MQ} \ldots \quad (53)$$

Then, the length q of an arc extending from the start point A through the middle point M to the end point B is determined in a step 5d. The length q of the arc can be determined from the angle $\angle AQB$ and the radius of the sector AMBQ.

Intervals $d_i$ of movement of the respective articulations for moving the tool center point TCP from the start point A to the end point B are calculated, using the equations (37), (39), as follows:

$$d_i = ra_i - rb_i \ldots \quad (54)$$

in a step 6d. Then, the number N of interpolating points are determined according to the equations (27) through (30) in steps 7d through 11d. By setting the interpolating number N in the manner described above, maximum interpolating data capable of being processed by the robot controller 20 can be generated, and hence the arc welding robot 14 can weld the workpiece 15 highly accurately.

Based on the interpolating number N thus determined, interpolating points Dj (j=1, 2, ... N−1) from the start point A to the end point B for the tool center point TCP are determined. If $\angle AQB = \theta$, then $\angle DjQDj+1$ ($\equiv \Delta\theta$) is expressed, using the interpolating number 4, as:

$$\Delta\theta = \theta/N \ldots \quad (55)$$

A vector $E_{QA}$ from the center Q to the start point A, a vector $E_{QM}$ from the center Q to the middle point M, and a vector $E_{QB}$ from the center Q to the end point B are determined, and, by using these vectors $E_{QA}$, $E_{QM}$, $E_{QB}$, vectors $V_{AM}$, $V_{MB}$, $V_{QA}$ are determined as follows:

$$E_{QA} \times E_{QM} = V_{AM} \ldots \quad (56)$$

$$E_{QM} \times E_{QB} = V_{MB} \ldots \quad (57)$$

$$E_{QA} \times E_{QB} = V_{QA} \ldots \quad (58)$$

An optimum one of these vectors $V_{AM}$, $V_{MB}$, $V_{QA}$ is selected and referred to as $V_Q$, the vector $V_Q$ being normal to the plane of the sector AMBQ. Then, a rotation matrix R$\Delta\theta$ for rotating the vector $V_Q$ through the angle $\Delta\theta$ given by the equation (55) around the vector $V_Q$ is determined in a step 12d.

Subsequently, the positions and postures of the respective articulations at the interpolating points Dj (j=1, 2, ... N−1) are determined using the rotation matrix R$\Delta\theta$ in a step 13d. Since the transformation matrices Ta for the start point A have already been determined according to the equation (40), transformation matrices Tdj for the interpolating points Dj are given by operating the rotation matrix $R\Delta\theta$ on the transformation matrices Ta as follows:

$$Tdj = (R\Delta\theta)^j \cdot Ta \ldots \quad (59)$$

By inversely transforming the transformation matrices Tdj, next angles $rd_i$ (i=1, 2, ... 6) of the articulations with respect to the interpolating points Dj can be determined in a step 14d. Pulses PDj with respect to the interpolating points Dj are determined from the angles $r_{di}$ as follows:

$$PDj = \left( \frac{rd_i}{k_{3i}} + k_{2i} \right) \cdot k_{1i} \quad (60)$$

in a step 15d.

Then, the robot controller 20 applies the pulses PDi to the arc welding robot 14 to move the tool center point TCP to the interpolating points Dj in a step 16d. Likewise, the steps 13d through 16d are repeated as many times as the interpolating number N to effect circular interpolation from the start point via the middle point to the end point.

During the above teaching process, pulse data for the respective robot axes are sampled and stored by positioning the tool center point TCP of the welding torch on three reference points which are not present on one straight line and which are established on the welding conveyor line. Any desired teaching points which do not lie on one straight line may be used as such teaching points.

Figure 3:
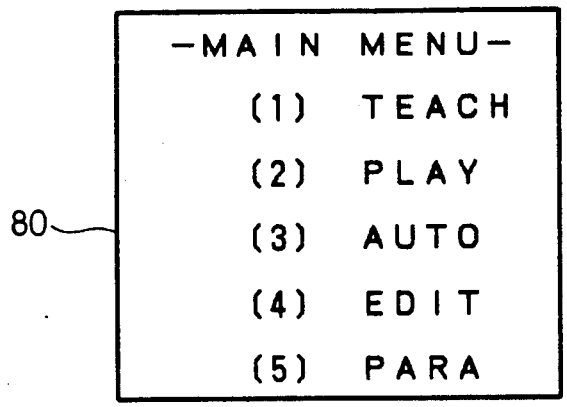
FIGS. 3 and 4 are views of menus displayed on the teaching box illustrated in FIG. 2.

After the teaching process for the arc welding robot 14 has been completed, the operator displays the main menu 80 shown in FIG. 3 on the LCD 70 of the teaching box 18. Then, the mode selection switch 56 is turned to position "2" to select the playback mode for thereby playing back the arc welding robot 14 so that the teaching data can be confirmed.

When the operation of the arc welding robot 14 according to the teaching data has been confirmed, the main menu 80 is displayed again on the LCD 70, and the key indicating "3" on the ten-key pad 60 is depressed to select the automatic mode. The arc welding robot 14 is controlled by the sequencer 12 to weld the workpiece 15 based on the teaching data issued from the robot controller 20. Because the robot controller 20 holds the teaching data which have been preset in the teaching mode for the hydraulic motors 30, 34, 40, 44 and the hydraulic cylinder 38, the robot controller 20 can supply the data to the arc welding robot 14 at a high speed. Therefore, the arc welding operation can be effected with great speed.

If a different lot of workpieces 15 are to be processed, or the arc welding robot 14 is dismounted from the welding conveyor line for maintenance, the tool center point TCP of the welding torch 46 may not be placed in a desired position on the workpiece 15. To avoid this problem, according to the present invention, the "BASE-MDI" or "BASE-MDI" mode on the teaching mode menu 82 is selected to correct the teaching data. A process of correcting the teaching data will be described below with reference to the flowchart of FIG. 10.

First, the operator displays the teaching mode menu 82 on the LCD 70, and selects the "BASE-MDI" mode, for example, after which the operator specifies the step number for a teaching point to be corrected and enters, through the ten-key pad 60, intervals $\Delta X$, $\Delta Y$, $\Delta Z$ of movement of the tool center point TCP with respect to the workpiece 15 with reference to the base coordinate system Oo.

The robot controller 20 receives present pulses Pi (i=1, 2, ... 6) from the potentiometers of the arc welding robot 14, and determines, from the received pulses Pi, present angles $r_i$ of the respective articulations with respect to the adjacent coordinate systems $O_1$ through $O_6$ according to the equation (1) in a step 1e.

Then, transformation matrices T according to the equation (2) are calculated in a step 2e from the present angles ri calculated according to the equation (1). The transformation matrices T are used to calculate a present position C of the tool center point TCP according to the equation (4) in a step 3e.

The robot controller 20 reads the intervals $\Delta X$, $\Delta Y$, $\Delta Z$ entered by the operator as correcting data for the teaching data in a step 4e, and determines a new position C' for the tool center point TCP by using the intervals $\Delta X$, $\Delta Y$, $\Delta Z$ in a step 5e. More specifically, the new position C' for the tool center point TCP is determined by:

$$c'_x = c_x - \Delta X \ldots \quad (61a)$$

$$c'_y = c_y - \Delta Y \ldots \quad (61b)$$

$$c'_z = c_z - \Delta Z \ldots \quad (61c)$$

where $c_x$, $c_y$, $c_z$ are the components of the present position C in the directions Xo, Yo, Zo, respectively, and $c'_x$, $c'_y$, $c'_z$ are the components of the new position C' in the directions Xo, Yo, Zo, respectively.

Then, transformation matrices T' when the tool center point TCP is moved to the new position C' are determined according to the equation (1) in a step 6e, and next angles $r_i'$ (i=1, 2, ... 6) of the respective articulations associated with the coordinate systems $O_1$ through $O_6$ are determined by inversely transforming the transformation matrices T' in a step 7e. As a result, next pulses Pi' after the teaching data have been corrected are determined from the angles $r_i'$ according to the equation (2) in a step 8e. Then, the robot controller 20 stores the pulses Pi' determined in the step 8e as corrected teaching data in the memory thereof in a step 9e. The above process is repeated for all teaching points which are to be corrected, thus providing corrected teaching data about desired position and posture.

While the tool center point TCP is positionally corrected with reference to the base coordinate system Oo in the above embodiment, it is also possible to correct the position of the tool center point TCP and the posture of the welding torch 46 with reference to the hand coordinate system Oe defined at the tool center point TCP. In this case, the operator selects the "HAND-MDI" mode from the teaching mode menu 82 displayed on the LCD 70, and enters intervals of movement of the tool center point TCP as viewed from the hand coordinate system Oe through the ten-key pad 60. The subsequent steps are executed, for obtaining desired pulses for the respective articulations. Since the intervals of movement of the tool center point TCP are measured with reference to the hand coordinate system Oe fixed to the tool center point TCP, the operator can set the intervals of movement more easily than if the base coordinate system Oo is used. In this procedure, after the intervals of movement along the axes Xe, Ye, Ze of the hand coordinate system Oe have been set in the step 4e, these intervals are converted to intervals $\Delta X$, $\Delta Y$, $\Delta Z$ as viewed from the base coordinate system Oo, and then the step 5e and the subsequent steps are executed, for obtaining desired pulses for the respective articulations.

In the present embodiment, the teaching data can be corrected by selecting the editing mode selected from the main menu 80. A process of correcting the teaching data in the editing mode will be described below with reference to the flowchart shown in FIGS. 11a and 11b.

The operator displays the main menu 80 on the LCD 70, and enters "4" from the ten-key pad 60 to convert old teaching mode to new teaching mode (three-dimensional shifting) in the editing mode.

The robot controller 20 determines the positions of three reference points which do not lie on a single straight line from old teaching data, in a step 1f. The data of the reference points are held as pulses Pi. Present angles $r_i$ of the respective articulations associated with the adjacent coordinate systems $O_1$ through $O_6$ are determined from the pulses Pi according to the equation (1). Transformation matrices T are then calculated from the angles $r_i$, and the positions F of the reference points in the old teaching data are calculated from the transformation matrices T according to the equation:

$$F = T \cdot h = a \cdot h_o + b \ldots \quad (62)$$

where a indicates the elements in four rows and three columns on the lefthand side of the transformation matrices T and b indicates the elements in four rows and one column on the righthand side of the transformation matrices T.

Then, the tool center point TCP of the welding torch 36 is moved to the three reference points used when the old teaching data are generated, in a step 2f, and the positions G of the tool reference point TCP in the reference points are determined in a step 3f. The positions G of the tool center point TCP can be determined in the same manner as in the step 1f.

After the above preparatory operation is finished, the robot controller 20 compares the positions F of the reference points in the old teaching data and the positions G of the tool center point TCP after the teaching data are corrected, to calculate a transformation matrix $T_M$ for generating new teaching data. The procedure of calculating the transformation matrix $T_M$ will be described below with reference to FIGS. 12a through 12c. It is assumed that the positions F of the three reference points with respect to the base coordinate system Oo are indicated by $F_1$, $F_2$, $F_3$, respectively, and the positions G of the tool center point TCP after the data are corrected are indicated by $G_1$, $G_2$, $G_3$, respectively.

Figure 12A:
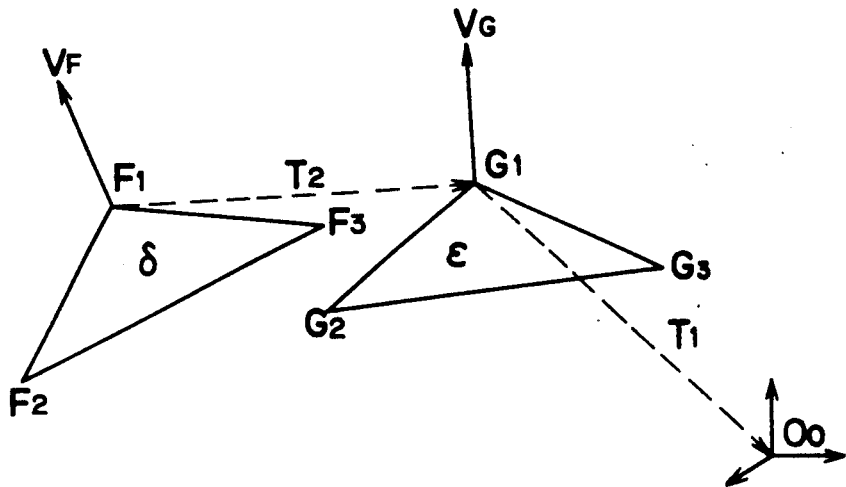

First, a transformation matrix $T_1$ for translating the position $G_1$ to the origin of the base coordinate system Oo is determined in a step 4f (see FIG. 12a). Then, the positions $F_1$, $F_2$, $F_3$, $G_1$, $G_2$, $G_3$ are translated in a step 5f by using the transformation matrix $T_1$ which has been determined in the step 4f. Positions $F_1^*$, $F_2^*$, $F_3^*$, $G_1^*$, $G_2^*$, $G_3^*$ reached after the translation are expressed by:

$$Fj^* = T_1 Fj \ldots \quad (63)$$

$$Gj^* = T_1 Gj \ldots \quad (64)$$

(j = 1, 2, 3)

Figure 12B:
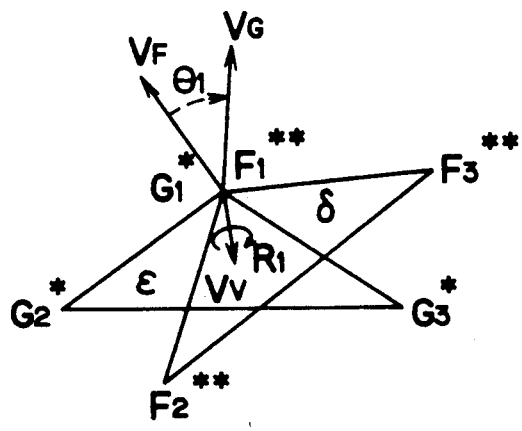
Figure 12C:
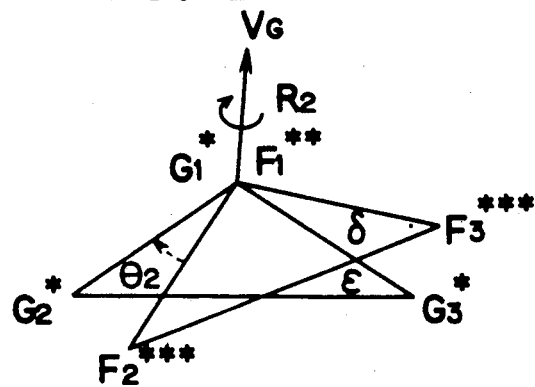

Then, a transformation matrix $T_2$ for translating the position $F_1^*$ to the position $G_1^*$ is determined in a step 6f (see FIG. 12b). The positions $F_1^*$, $F_2^*$, $F_3^*$ are translated by using the transformation matrix $T_2$ in a step 7f, and positions $F_1^{}$, $F_2^{}$, $F_3^{**}$ reached after the translation are defined by:

$$Fj^{**} = T_2 Fj^* \ldots \quad (65)$$

(j = 1, 2, 3)

As a result, a triangle $\delta$ having the positions $F_1$, $F_2$, $F_3$ at the respective corners and a triangle $\epsilon$ having the positions $G_1$, $G_2$, $G_3$ at the respective corners are located in the base coordinate system Oo with the positions $F_1^{**}$, $G_1^*$ lying on the origin of the base coordinate system Oo (see FIG. 12b).

A vector $V_F$ normal to the triangle $\delta$ and a vector $V_G$ normal to the triangle $\epsilon$ are determined in a step 8f. Assuming that a vector extending from $F_1^{}$ to $F_2^{}$ is indicated by $F_{1\,2}^{}$, a vector extending from $F_1^{}$ to $F_3^{}$ is indicated by $F_{1\,3}^{}$, a vector extending from $G_1^*$ to $G_2^*$ is indicated by $G_{1\,2}^*$, and a vector extending from $G_1^*$ to $G_3^*$ is indicated by $G_{1\,3}^*$, the vectors $V_F$, $V_G$ are expressed by:

$$V_F = F_{1\,2}^{} \times F_{1\,3}^{} \ldots \quad (66)$$

$$V_G = G_{1\,2}^* \times G_{1\,3}^* \ldots \quad (67)$$

The outer product of the vectors $V_F$, $V_G$ is determined in a step 9f as a vector $V_V$ as follows:

$$V_V = V_F \times V_G \ldots \quad (68)$$

An angle $\theta_1$ formed between the vectors $V_F$, $V_G$ is then determined in a step 10f. A rotation matrix $R_1$ for rotating the triangle $\delta$ about the vector $V_V$ is determined from the angle $\theta_1$ in a step 11f.

Using the rotation matrix $R_1$, the positions $F_2^{}$, $F_3^{}$ are rotated about the vector $V_V$ through the angle $\theta$ in a step 12f. At this time, the triangles $\delta$, $\epsilon$ lie on the same plane (see FIG. 12c). The rotated positions $F_2^{}$, $F_3^{}$ are expressed as $F_2^{*}$, $F_3^{*}$, respectively, which are given by:

$$F_2^{*} = R_1 F_2^{} \ldots \quad (69)$$

$$F_3^{*} = R_1 F_3^{} \ldots \quad (70)$$

Then, an angle $\theta_2$ formed between a vector $F_{1\,2}^{*}$ extending from $F_1^{}$ to $F_2^{***}$ and a vector $G_{1\,2}^*$ extending from $G_1^*$ to $G_2^*$ is determined in a step 13f. A rotation matrix $R_2$ for rotating the triangle $\delta$ about the vector $V_G$ through the angle $\theta_2$ is determined from the angle $\theta_2$ in a step 14f. Using the rotation matrix $R_2$, the positions $F_2^{*}$, $F_3^{*}$ are rotated about the vector $V_G$ through the angle $\theta_2$ to bring the triangles $\delta$, $\epsilon$ into superposed relation. The transformation matrix $T_M$ is then determined from the matrixes determined in the steps 4f, 6f, 11f, 14f as follows:

$$T_M = T_1^{-1} R_2 R_1 T_2 T_1 \ldots \quad (71)$$

New teaching data can be generated by operating the transformation matrix $T_M$ on the old teaching data in a step 16f.

In some instances, if the workpiece 15 to be welded by the arc welding robot 14 has a partly different shape, the welding torch 46 or another portion of the arc welding robot 14 may physically interfere with the workpiece 15. Should this happen, the welding torch 46 must be replaced with another welding torch of different dimensions. According to the present embodiment, the parameter setting mode is selected from the main menu 80, and dimensional data of the new welding torch 46 are entered to correct the teaching data. A process of generating teaching data for a new welding torch will be described below with reference to the flowchart of FIG. 13.

The operator first selects the "PARA" mode from the main menu 80 displayed on the LCD 70, and enters the welding torch dimensional data through the ten-key pad 60.

First, the robot controller 20 receives pulses Pi (i=1, 2, ... 6) representing the present position from the non-illustrated potentiometers mounted on the hydraulic motors 30, 34, 40, 44 and the hydraulic cylinder 38 of the arc welding robot 14. Then, the robot controller 20 determines, from the received pulses Pi, present angles $r_i$ of the respective articulations with respect to the adjacent coordinate systems $O_1$ through $O_6$ according to the equation (1) in a step 1g.

Then, transformation matrices T are calculated from the present angles ri according to the equation (2) in a step 2g. The transformation matrices T are used to calculate a present position C of the tool center point TCP according to the equation (4) in a step 3g.

The robot controller 20 determines whether there is an end effector change command from the teaching box 18 in a step 4g. If no end effector change command is received, the present pulses Pi are held in a step 5g.

If the parameter setting mode is selected on the teaching box 18, the robot controller 20 reads data entered from the ten-key pad 60 as dimensional data of a new welding torch which replaces the existing welding torch, in a step 6g. The dimensional data are defined as a vector h' composed of components $h_1'$, $h_2'$, $h_3'$, the vector h' being given by:

$$h' = \begin{pmatrix} h_1' \\ h_2' \\ h_3' \\ 1 \end{pmatrix} = \begin{pmatrix} h_o \\ 1 \end{pmatrix} \quad (72)$$

Transformation matrices T' with respect to the coordinate system $O_1$ when the new welding torch is employed are defined as:

$$T' = [a' | b'] \ldots \quad (73)$$

Since the position of the tool center point TCP and the posture of the new welding torch must be the same as the position of the tool center point TCP of the old welding torch 46 and the posture of the old welding torch 46, respectively, we get:

$$T' \cdot h' = a' \cdot h_o' + b' = C \ldots \quad (74)$$

$$a' = a \ldots \quad (75)$$

Therefore, from the equations (4), (74), and (75), $$a' \cdot h_o' + b' = a \cdot h_o + b \text{ Hence, } b' = a \cdot (h_o - h_o') + b \ldots \quad (76)$$

As a consequence, the transformation matrices T' are determined in a step 7g from the equation (73) as follows:

$$T = [a | a' \cdot (h_o - h_o') + b] \ldots \quad (77)$$

By inversely transforming the transformation matrices T', next angles $r_i'$ (i=1, 2, ... 6) of the articulations associated with the respective coordinate systems $O_1$ through $O_6$ can be determined in a step 8b. As a result, next pulses Pi' are determined from the angles $r_i'$ according to the equation (12).

The robot controller 20 stores the pulses Pi' as corrected teaching data in the non-illustrated memory thereof. The above process is repeated with respect to all teaching points to generate teaching data for the new welding torch.

With the present invention, as described above, an end effector of an articulated robot is moved while fixing the posture of the end effect at its tool center point, by using the coordinate transformation matrices of articulations and moving vectors for the tool center point. The end effector can be moved while being maintained at a constant posture with respect to a workpiece. Data on the conditions of the articulations can easily be calculated, at the time of teaching the robot, by employing new coordinate transformation matrices which are set by the coordinate transformation matrices and the moving vectors. Therefore, the time required to calculate the data is shortened, and the speed of operation of the robot when it is played back is increased.

The posture of the end effector can be varied while fixing the position of the tool center point by using coordinate transformation matrices and a rotation matrix which is established from changes in the posture of the end effector from reference coordinates. Data on the conditions of the articulations can easily be calculated, at the time of teaching the robot, by employing new coordinate transformation matrices which are set by the coordinate transformation matrices and the rotation matrix. Therefore, the time required to calculate the data when teaching the robot is shortened, and the speed of operation of the robot when it is played back is increased. Since teaching data are determined by using the coordinate transformation matrices and the rotation matrix, it is highly facilitated to transform data into another coordinate system. When varying the posture of the end effector, it is possible to select a desired coordinate system, and the efficiency of operation is increased.

Furthermore, interpolating points between two points given in a teaching process are determined by dividing the positions of the two points and the postures at the two points by a prescribed interpolating number. Consequently, inasmuch as the posture of the end effector with respect to the workpiece is smoothly varied between the two points, it is possible to establish the posture of the end effector at the interpolating points with respect to the workpiece highly easily and accurately, so that highly accurate operation of the robot is made possible.

Interpolating points for effecting circular interpolation between three adjacent points given in a teaching process are determined by dividing the distances between the three points by a prescribed interpolating number while taking into account the posture of the end effector. Consequently, as the posture of the end effector with respect to the workpiece is smoothly varied between the three points, the posture of the end effector at the interpolating points with respect to the workpiece can be established highly easily and accurately, so that highly accurately robot operation is rendered possible.

Moreover, for correcting teaching data for a robot, the interval of movement of the tool center point of an end effector with respect to the workpiece is determined before the teaching data are corrected, and the teaching data are corrected based on the determined interval of movement. It is not necessary to teach the robot again for correcting the data, and hence the process of correcting the data is quite simple and easy to perform. Because it does not take a long time to generate data, the production line incorporating the robot is not adversely affected by the data correcting process, and the operating efficiency of the production line is increased. Since the teaching data are corrected while taking into account the posture of the end effector, it is possible to enable the robot to operate highly accurately.

Coordinate transformation matrices are determined from the positions of three reference points before teaching data are corrected and the positions of the tool center point of the end effector when the end effector is moved to the reference points, and new teaching data are prepared by using the coordinate transformation matrices. It is not necessary to teach the robot again for correcting the data, and hence the process of correcting the data is quite simple and easy to perform. Because coordinates are translated and rotated with reference to the tool center point of the end effector, the position of the tool center point and the posture of the end effector with respect to a workpiece are accurately corrected, and highly accurate operation can be continued by using the corrected teaching data. Because it does not take a long time to generate data, the production line incorporating the robot is not adversely affected b the data correcting process, and the operating efficiency of the production line is increased.

When the end effector of a robot is replaced, teaching data are corrected on the basis of the dimensional data of the old end effector and the dimensional data of a new end effector. Accordingly, it is not necessary to teach the robot again for correcting the data, and hence the process of correcting the data is quite simple and easy to perform. Because it does not take a long time to generate data, the production line incorporating the robot is not adversely affected by the data correcting process, and the operating efficiency of the production line is increased.

Although certain preferred embodiments have been shown and described, it should be understood that many changes and modifications may be made therein without departing from the scope of the appended claims.

What is claimed is:

1. A method of teaching an articulated robot, including a plurality of articulations and an end effector having a tool center point, comprising the steps of:
    determining a first coordinate transformation matrix for transforming coordinates between the articulations from condition data of the articulations, said condition data comprising pulses produced by potentiometers mounted on the articulated robot;
    calculating a present position of the tool center point based on said first coordinate transformation matrix;
    determining a moving vector from said present position of the tool center point to a next position thereof;
    determining a second coordinate transformation matrix for further transforming coordinates between the articulations so that a posture of the end effector at said next position of the tool center point, which is calculated based on said first coordinate transformation matrix and said moving vector, will coincide with a posture of the end effector at said present position of the tool center point;
    moving the articulations according to said further transformed coordinates; and
    calculating new condition data of the articulations from said second coordinate transformation matrix.

2. A method of teaching an articulated robot, including a plurality of articulations and an end effector having a tool center point, comprising the steps of:
    determining a first coordinate transformation matrix for transforming coordinates between the articulations from condition data of the articulations, said condition data comprising pulses produced by potentiometers mounted on the articulated robot;
    calculating a present position of the tool center point based on said first coordinate transformation matrix;
    determining a rotation matrix with respect to a reference coordinate system for displacing a posture of the end effector at said present position of the tool center point;
    determining a second coordinate transformation matrix for further transforming coordinates between the articulations so that the end effector with said displaced posture, which is calculated based on said first coordinate transformation matrix and said rotation matrix, coincides with said present position of the tool center point;
    moving the articulations according to said further transformed coordinates; and
    calculating new condition data of the articulations from said second coordinate transformation matrix.

3. A method of teaching an articulated robot, including a plurality of articulations and an end effector having a tool center point, for effecting linear interpolation between first and second teaching points, said method comprising the steps of:
    determining a first coordinate transformation matrix and a second coordinate transformation matrix for the first and second teaching points, respectively, from condition data of the articulations, for transforming coordinates between the articulations, said condition data comprising pulses produced by potentiometers mounted on the articulated robot;
    calculating a position of the tool center point at the first and second teaching points based on said first and second coordinate transformation matrices, respectively;
    determining an interpolating number for dividing a determined distance between the first and second teaching points at intervals;
    determining a cumulative change in a position of the tool center point and a cumulative change in a posture of the end effector as the end effector moves from the first teaching point to the second teaching point;
    dividing said cumulative change in position and said cumulative change in posture by said interpolating number to determine incremental changes of position of the tool center point and incremental changes of posture of the end effector at respective interpolating points between the first and second teaching points;

determining corresponding positions of the tool center point and corresponding postures of the end effector at said respective interpolating points by using said incremental changes of position of the tool center point and said incremental changes of posture of the end effector between said respective interpolating points; and moving the articulations along said corresponding positions and postures according to said transformed coordinates.

4. The method of teaching an articulated robot of claim 3, said step of determining an interpolating number comprising the steps of:

calculating first and second interpolation numbers based upon a time period corresponding to the articulation which requires the longest time to move between the first and second teaching points and the maximum speed in which the articulated robot can be operated, respectively;

selecting a larger of said first and second interpolation numbers; and generating said interpolating number as said selected larger interpolation number multiplied by a ratio of said maximum speed to a desired speed of the tool center point.

5. A method of teaching an articulated robot, including a plurality of articulations and an end effector having a tool center point, for effecting circular interpolation between first, second, and third teaching points, said method comprising the steps of:

determining first, second, and third coordinate transformation matrices for the first, second, and third teaching points, respectively, from condition data of the articulations, for transforming coordinates between the articulations, said condition data comprising pulses produced by potentiometers mounted on the articulated robot;

calculating a position of the tool center point at the first, second, and third teaching points based on said first, second, and third coordinate transformation matrices, respectively;

determining a center and a length of an arc extending from the first teaching point through the second teaching point to the third teaching point;

determining an interpolating number for dividing said arc at intervals based on said length of said arc;

determining an angle formed between a vector extending from said center to the first teaching point and a vector extending from said center to the third teaching point;

dividing said angle by said interpolating number to determine a change in a direction of a vector extending from said center to an interpolating point;

determining a rotation matrix for said vector extending to said interpolating point based on said change in said direction;

operating said rotation matrix successively on said coordinate transformation matrices with respect to said first teaching point to determine respective positions of the tool center point and respective postures of the end effector at corresponding interpolating points; and moving the articulations along said respective positions and postures according to said transformed coordinates.

6. The method of teaching an articulated robot of claim 4, said step of determining an interpolating number comprising the steps of;

calculating first and second interpolation numbers based upon a time period corresponding to the articulation which requires the longest time to move between the first and second teaching points and the maximum speed in which the articulated robot can be operated, respectively;

selecting a larger of said first and second interpolation numbers; and generating said interpolating number as said selected larger interpolation number multiplied by a ratio of said maximum speed to a desired speed of the tool center point.

7. A method of teaching an articulated robot, having a plurality of articulations and an end effector having a tool center point, for correcting a position of the tool center point, comprising the steps of:

determining a coordinate transformation matrix for transforming coordinates between the articulations from condition data of the articulations, said condition data comprising pulses produced by potentiometers mounted on the articulated robot;

calculating a position of the tool center point before it is corrected, based on said coordinate transformation matrix;

determining an interval of movement of the tool center point with respect to a workpiece to be processed by the articulated robot;

calculating a position of the tool center point after it is corrected, from said position of the tool center point before it is corrected and said interval of movement;

determining a new coordinate transformation matrix for transforming coordinates between the articulations from said position of the tool center point after it is corrected;

moving the articulations according to said transforming coordinates corresponding to said new coordinate transformation matrix; and calculating new condition data of the articulations from said new coordinate transformation matrix.

8. A method of teaching an articulated robot, including a plurality of articulations and an end effector having a tool center point, for correcting old teaching data of the articulated robot, comprising the steps of:

determining positions of three reference points corresponding to the old teaching data, which are not present on one straight line and which are selected prior to correction of the teaching data based on condition data comprising pulses produced by potentiometers mounted on the articulated robot;

determining three new positions for the tool center point, corresponding to correction of teaching data, by moving the tool center point to said three new positions;

determining a coordinate transformation matrix for transforming coordinates of the tool center point to said three new positions based upon said three reference points of the old teachings data and said three new positions;

operating said coordinate transformation matrix on the old teaching data for correction thereof; and moving the articulations according to transformed coordinates corresponding to said corrected teaching data.

9. A method according to claim 8, further comprising the step of:

determining said coordinate transformation matrix so that a triangle having said three positions of said three reference points at respective corners thereof is superposed on a triangle having said three positions for the tool center point at respective corners thereof.

10. A method of teaching an articulated robot, having a plurality of articulations and a first end effector of a first shape having a tool center point, for replacing the first end effector with a second end effector of a second shape, comprising the steps of:

determining a coordinate transformation matrix for transforming coordinates between the articulations from condition data of the articulations, said condition data comprising pulses produced by potentiometers mounted on the articulated robot;

calculating a position of the tool center point of the first end effector based on said coordinate transformation matrix and dimensional data indicative of the first shape of the first end effector;

determining a new coordinate transformation matrix for transforming coordinates between the articulations so that a position of the tool center point of the second end effector and a posture of the second end effector will coincide respectively with said position of the tool center point of the first end effector and a posture of the first end effector;

moving the articulations according to said transforming coordinations corresponding to said new coordinate transformation matrix; and calculating new condition data of the articulations from said new coordinate transformation matrix.

* * * * *